United States Patent
Kaino et al.

(10) Patent No.: US 10,909,759 B2
(45) Date of Patent: Feb. 2, 2021

(54) INFORMATION PROCESSING TO NOTIFY POTENTIAL SOURCE OF INTEREST TO USER

(75) Inventors: Akihiko Kaino, Kanagawa (JP); Yoshiaki Iwai, Tokyo (JP); Kenichiro Oi, Kanagawa (JP); Shunichi Homma, Tokyo (JP); Jianing Wu, Tokyo (JP)

(73) Assignee: Sony Corporation, Tokyo (JP)

( * ) Notice: Subject to any disclaimer, the term of this patent is extended or adjusted under 35 U.S.C. 154(b) by 153 days.

(21) Appl. No.: 13/980,978

(22) PCT Filed: Dec. 19, 2011

(86) PCT No.: PCT/JP2011/007068
§ 371 (c)(1),
(2), (4) Date: Jul. 22, 2013

(87) PCT Pub. No.: WO2012/101720
PCT Pub. Date: Aug. 2, 2012

(65) Prior Publication Data
US 2013/0293586 A1 Nov. 7, 2013

(30) Foreign Application Priority Data
Jan. 28, 2011 (JP) ................... 2011-016440

(51) Int. Cl.
*G06T 19/00* (2011.01)
*G06F 3/00* (2006.01)
(Continued)

(52) U.S. Cl.
CPC ............ *G06T 19/006* (2013.01); *G06F 3/005* (2013.01); *G06F 3/048* (2013.01); *G06F 3/14* (2013.01); *G06T 11/00* (2013.01); *G08G 1/005* (2013.01)

(58) Field of Classification Search
CPC ................... G06T 19/006; G06T 11/00; G06T 2207/30261; G06F 3/005; G06F 1/163;
(Continued)

(56) References Cited

U.S. PATENT DOCUMENTS 8,457,879 B2 6/2013 Merkel et al.
2003/0210228 A1* 11/2003 Ebersole et al. .............. 345/157
(Continued)

FOREIGN PATENT DOCUMENTS

DE  10 2007 033 391 A1   1/2009
JP  2008-230296   10/2008
WO  WO 2009152875 A1 * 12/2009   ............... G06T 5/00

OTHER PUBLICATIONS

D. Gerónimo, A. M. López, A. D. Sappa and T. Graf, "Survey of Pedestrian Detection for Advanced Driver Assistance Systems," in IEEE Transactions on Pattern Analysis and Machine Intelligence, vol. 32, No. 7, pp. 1239-1258, Jul. 2010, doi: 10.1109/TPAMI.2009.122. (Year: 2010).*

(Continued)

*Primary Examiner* — Xiao M Wu
*Assistant Examiner* — Scott E Sonners
(74) *Attorney, Agent, or Firm* — Chip Law Group

(57) ABSTRACT

An apparatus comprising a memory storing instructions is provided. The apparatus includes a control unit for executing the instructions to send signals to display, for a user, a first virtual image superimposed onto a representation of real space. The control unit further executes instructions to send signals to identify a potential source of interest for the user, the potential source of interest being outside of a user focus area in the representation of real space. The control unit further executes instructions to send signals to notify the user of the potential source of interest.

22 Claims, 17 Drawing Sheets

(51) Int. Cl.
  *G06T 11/00* (2006.01)
  *G06F 3/048* (2013.01)
  *G06F 3/14* (2006.01)
  *G08G 1/005* (2006.01)

(58) Field of Classification Search
  CPC ......... G06F 3/011; G08G 1/005; G02B 27/01; G02B 2027/014; G02B 2027/0138; G09G 2354/00
  See application file for complete search history.

(56) References Cited

U.S. PATENT DOCUMENTS

| | | | | |
|---|---|---|---|---|
| 2005/0146600 | A1* | 7/2005 | Chipchase | H04M 1/72522 348/14.02 |
| 2006/0227012 | A1* | 10/2006 | He | G01C 23/005 340/945 |
| 2008/0239078 | A1* | 10/2008 | Mohr | G06T 7/0042 348/148 |
| 2009/0293012 | A1* | 11/2009 | Alter | G01C 21/20 715/810 |
| 2010/0104199 | A1* | 4/2010 | Zhang | G06K 9/00798 382/199 |
| 2010/0238161 | A1* | 9/2010 | Varga | G06T 17/05 345/419 |
| 2010/0289632 | A1* | 11/2010 | Seder | G01S 13/723 340/436 |
| 2011/0043617 | A1* | 2/2011 | Vertegaal | G06F 3/011 348/78 |
| 2011/0143816 | A1* | 6/2011 | Fischer | G08G 1/16 455/566 |
| 2011/0157184 | A1* | 6/2011 | Niehsen | G06T 5/00 345/440 |

OTHER PUBLICATIONS

"Sekai Camera for Android Ver. 3.0.4", Sekai Camera Web.Sekai Camera Support CenterHomeServiceHowToFAQDownloadContact . . . Sekai Camera for Android V 3.0.4 release! Filed in World of Sekai Camera, Jan. 18, 2012, (5 pages).

Communication pursuant to Article 94(3) EPC, (Application No. 11 857 123.1-1959), European Patent Office, Notification dated Jan. 21, 2016.

* cited by examiner

[Fig. 1]
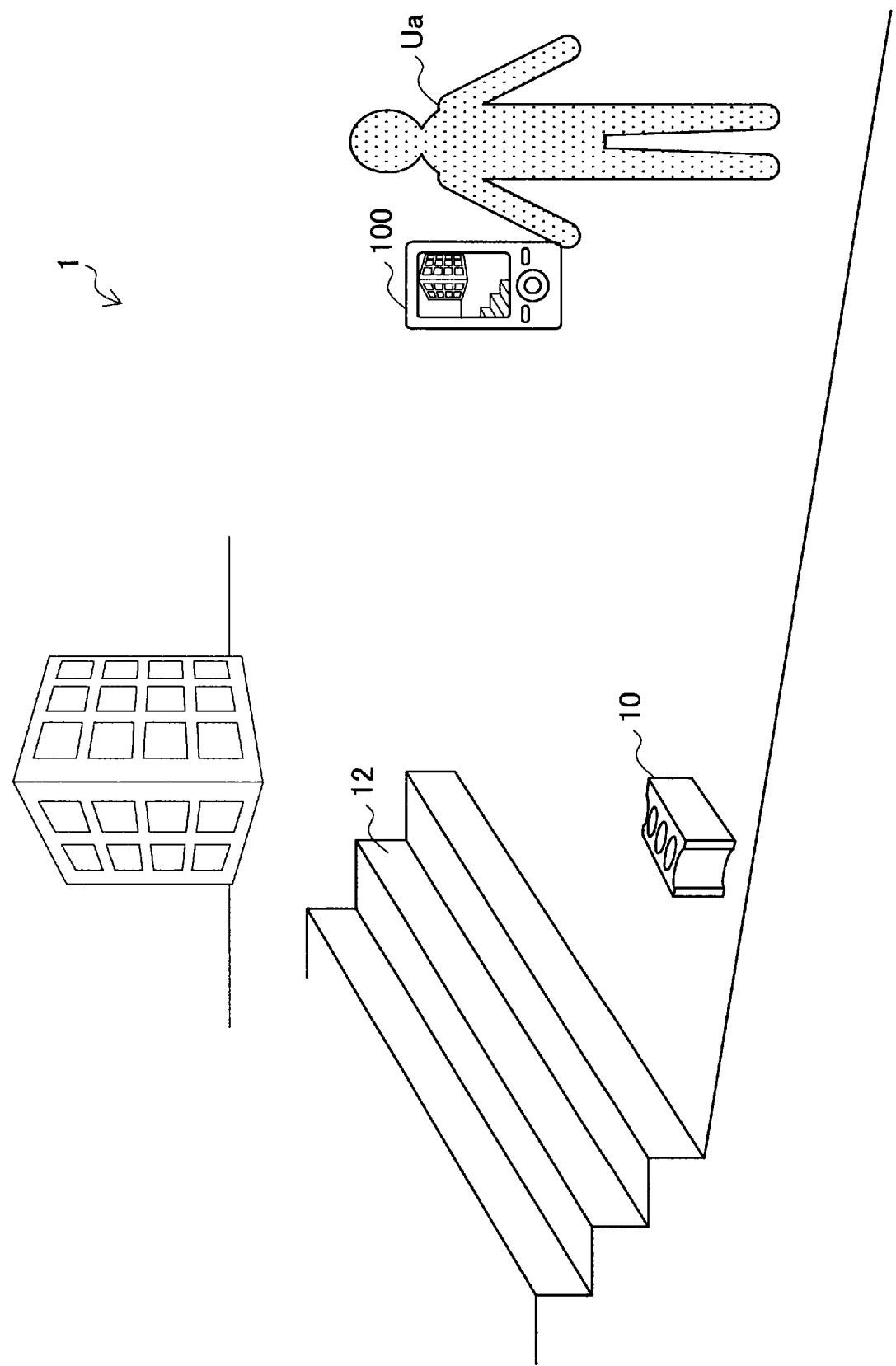

[Fig. 2]
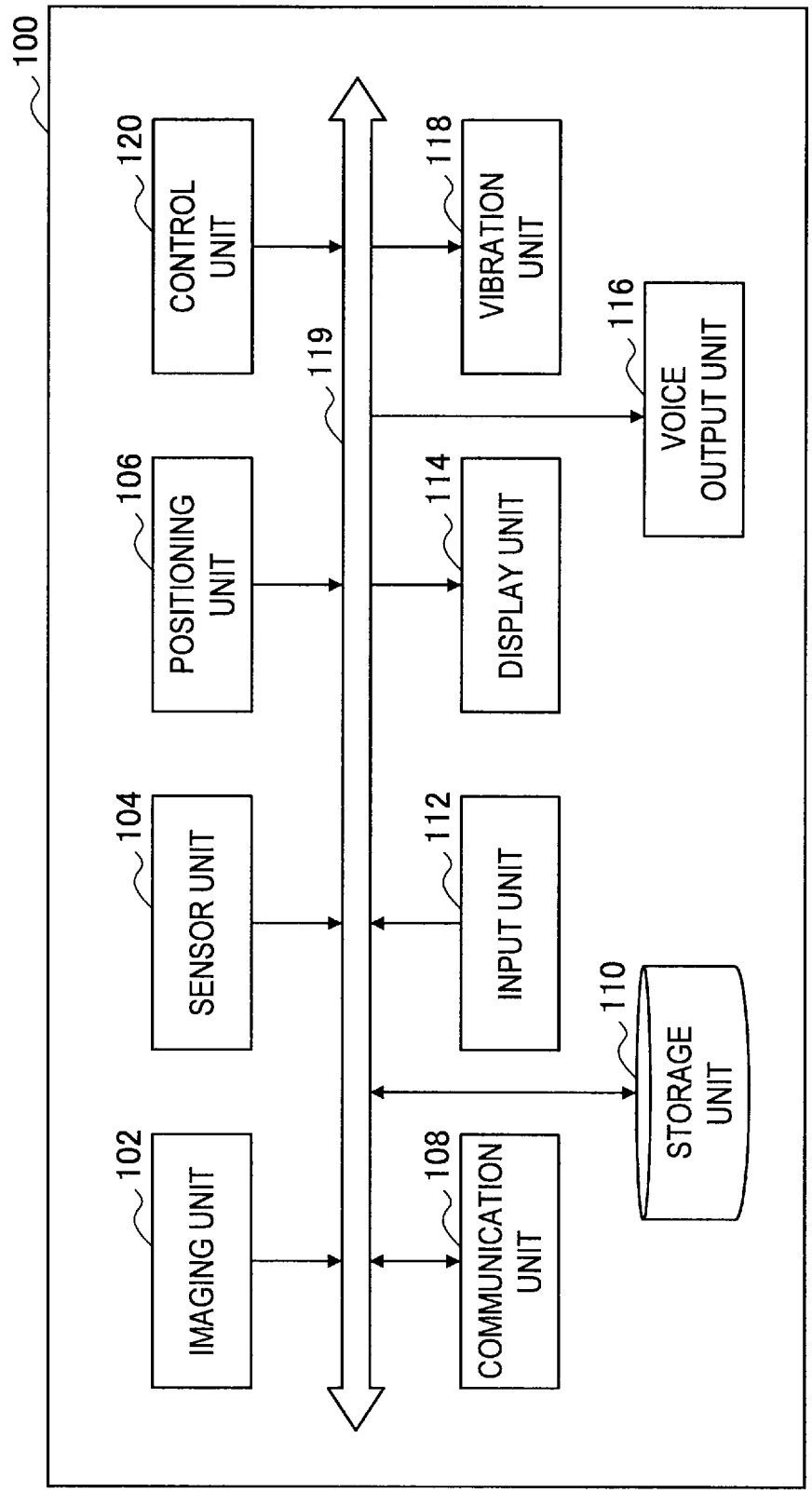

[Fig. 3]
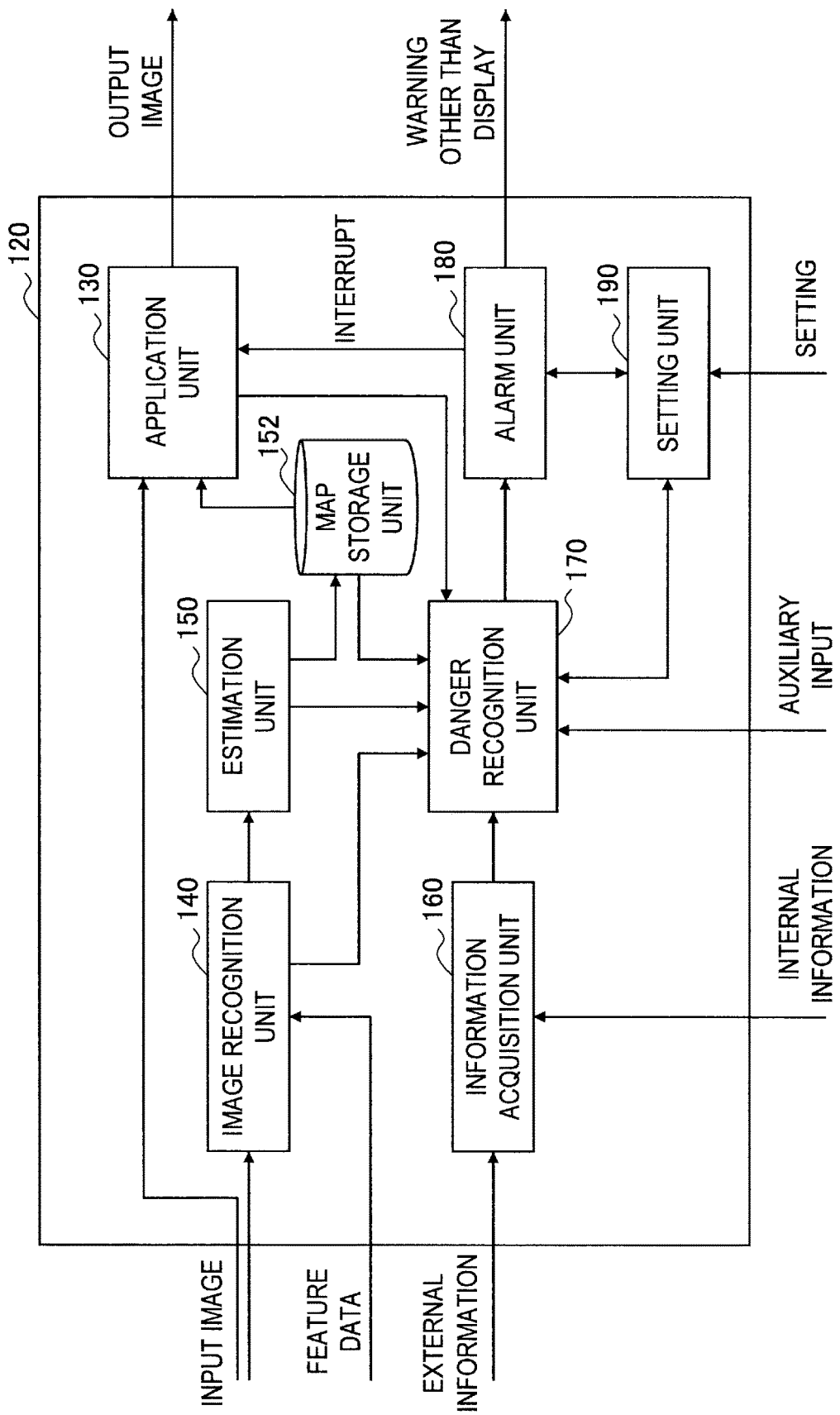

[Fig. 4]
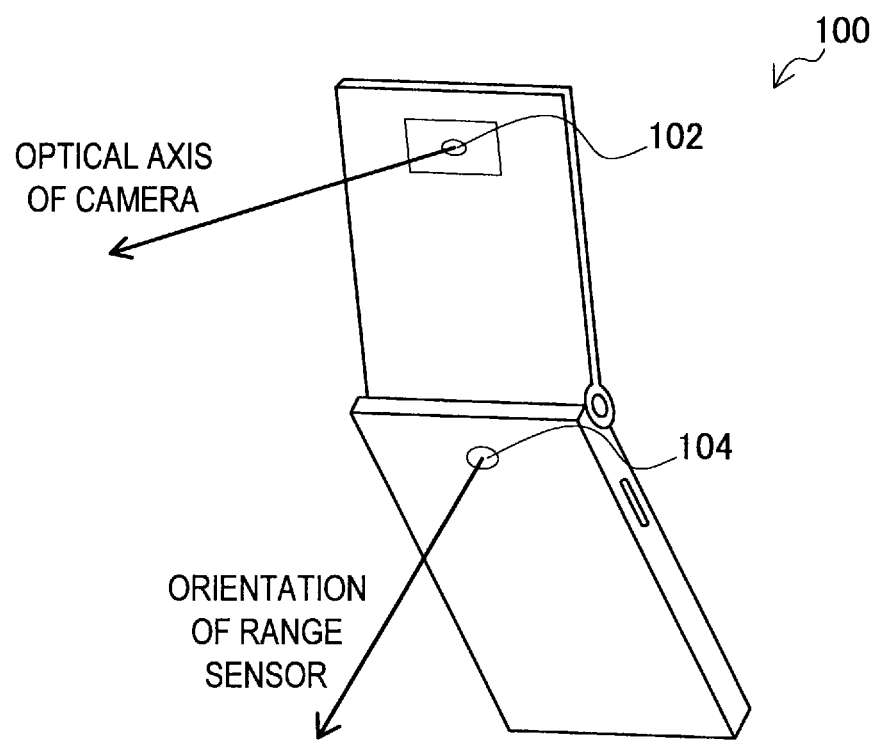
[Fig. 5]
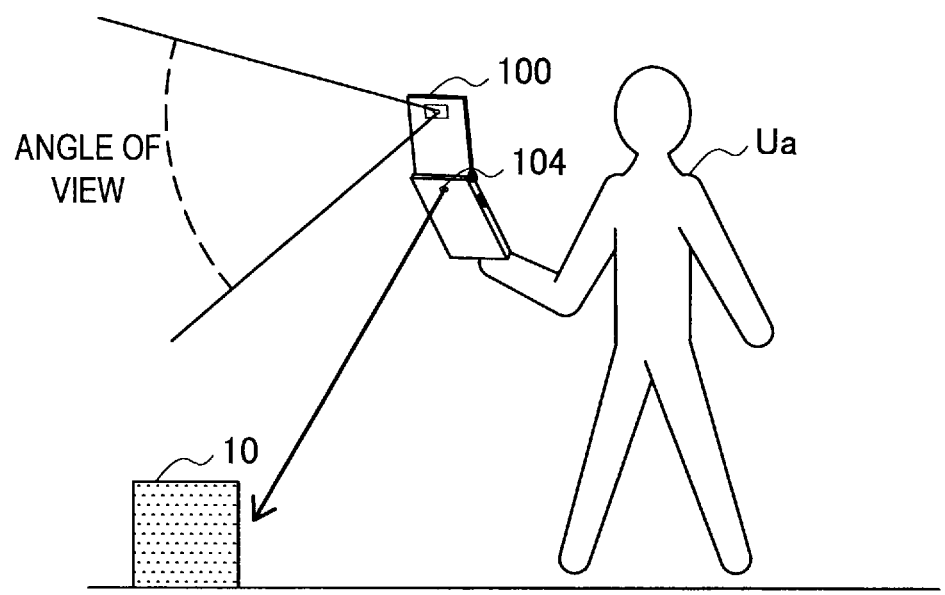

[Fig. 6]

| PARAMETER EXAMPLE | EXAMPLE OF PARAMETER VALUE ACQUISITION METHOD |
|---|---|
| USER POSITION | • POSITIONING USING GPS<br>• ESTIMATION BASED ON IMAGE RECOGNITION RESULT<br>• CALCULATION FROM POSITIONAL RELATIONSHIP WITH KNOWN REAL OBJECT |
| USER'S TRAVEL SPEED | • CALCULATION FROM CHANGE IN USER POSITION<br>• MEASUREMENT USING ACCELERATION SENSOR |
| POSITION OF STATIC OBJECT | • RECOGNITION FROM INPUT IMAGE (RELATIVE POSITION)<br>• PRESTORAGE OF POSITION DATA<br>• ACQUISITION OF POSITION DATA FROM EXTERNAL DEVICE |
| DISTANCE FROM STATIC OBJECT | • CALCULATION FROM USER POSITION AND POSITION OF STATIC OBJECT<br>• MEASUREMENT USING RANGE SENSOR |
| APPROACH SPEED TO STATIC OBJECT | • CALCULATION FROM CHANGE IN DISTANCE FROM STATIC OBJECT |
| POSITION OF DYNAMIC OBJECT | • RECOGNITION FROM INPUT IMAGE (RELATIVE POSITION)<br>• ACQUISITION OF POSITION DATA FROM EXTERNAL DEVICE |
| DISTANCE FROM DYNAMIC OBJECT | • CALCULATION FROM USER POSITION AND POSITION OF DYNAMIC OBJECT<br>• MEASUREMENT USING RANGE SENSOR |
| APPROACH SPEED TO DYNAMIC OBJECT | • CALCULATION FROM CHANGE IN DISTANCE FROM DYNAMIC OBJECT |
| PRESENCE OF DANGEROUS OBJECT | • RECOGNITION FROM INPUT IMAGE<br>• RECEIPT OF BEACON ISSUED BY DANGEROUS OBJECT<br>• RECOGNITION FROM USER POSITION AND POSITION OF DANGEROUS OBJECT |
| POSITION OF DANGEROUS OBJECT | • (SAME AS POSITION OF STATIC OBJECT OR DYNAMIC OBJECT) |
| RANGE OF DANGEROUS REGION | • RECOGNITION FROM INPUT IMAGE<br>• PRESTORAGE OF DANGEROUS REGION INFORMATION<br>• ACQUISITION OF DANGEROUS REGION INFORMATION FROM EXTERNAL DEVICE |
| OBJECT OCCUPANCY RATE | • CALCULATION BASED ON INFORMATION FROM AR APPLICATION |

[Fig. 7]

| DANGER TYPE | EXAMPLE OF RECOGNITION CRITERIA |
|---|---|
| COLLISION WITH STATIC OBJECT | · COMPARISON OF DISTANCE FROM STATIC OBJECT WITH THRESHOLD<br>· COMPARISON OF APPROACH SPEED TO STATIC OBJECT WITH THRESHOLD |
| COLLISION WITH DYNAMIC OBJECT | · COMPARISON OF DISTANCE FROM DYNAMIC OBJECT WITH THRESHOLD<br>· COMPARISON OF APPROACH SPEED TO DYNAMIC OBJECT WITH THRESHOLD |
| APPROACH TO DANGEROUS OBJECT | · DETECTION OF PRESENCE OF DANGEROUS OBJECT<br>· COMPARISON OF DISTANCE FROM DANGEROUS OBJECT WITH THRESHOLD |
| APPROACH/ENTRY INTO DANGEROUS REGION | · DETERMINATION THAT CURRENT POSITION IS WITHIN DANGEROUS REGION<br>· COMPARISON OF DISTANCE FROM DANGEROUS REGION WITH THRESHOLD |
| INHIBITION OF USER'S ATTENTION | · COMPARISON OF OBJECT OCCUPANCY RATE WITH THRESHOLD<br>· COMPARISON OF USER'S TRAVEL SPEED WITH THRESHOLD |

[Fig. 8]
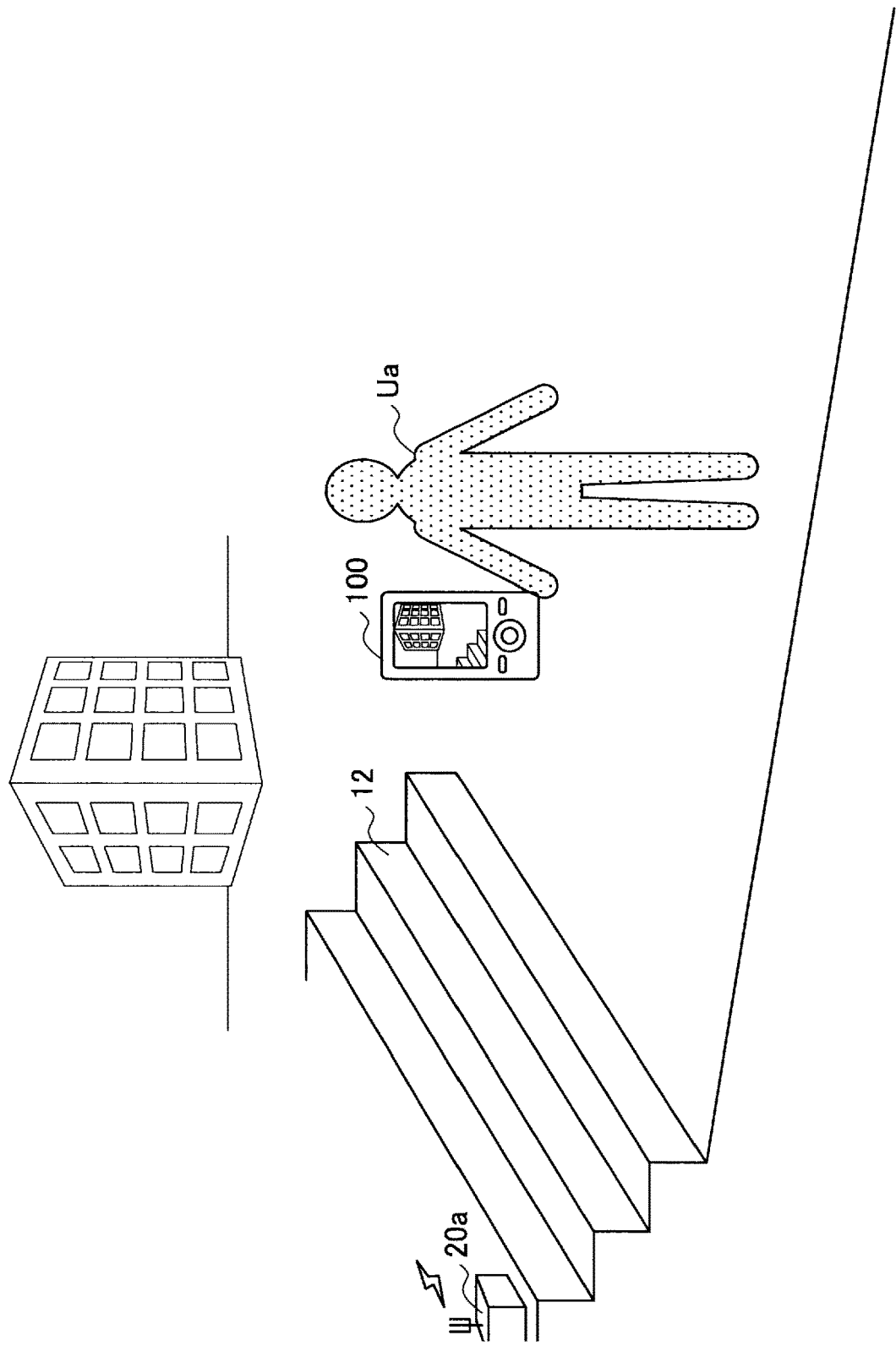

[Fig. 9]
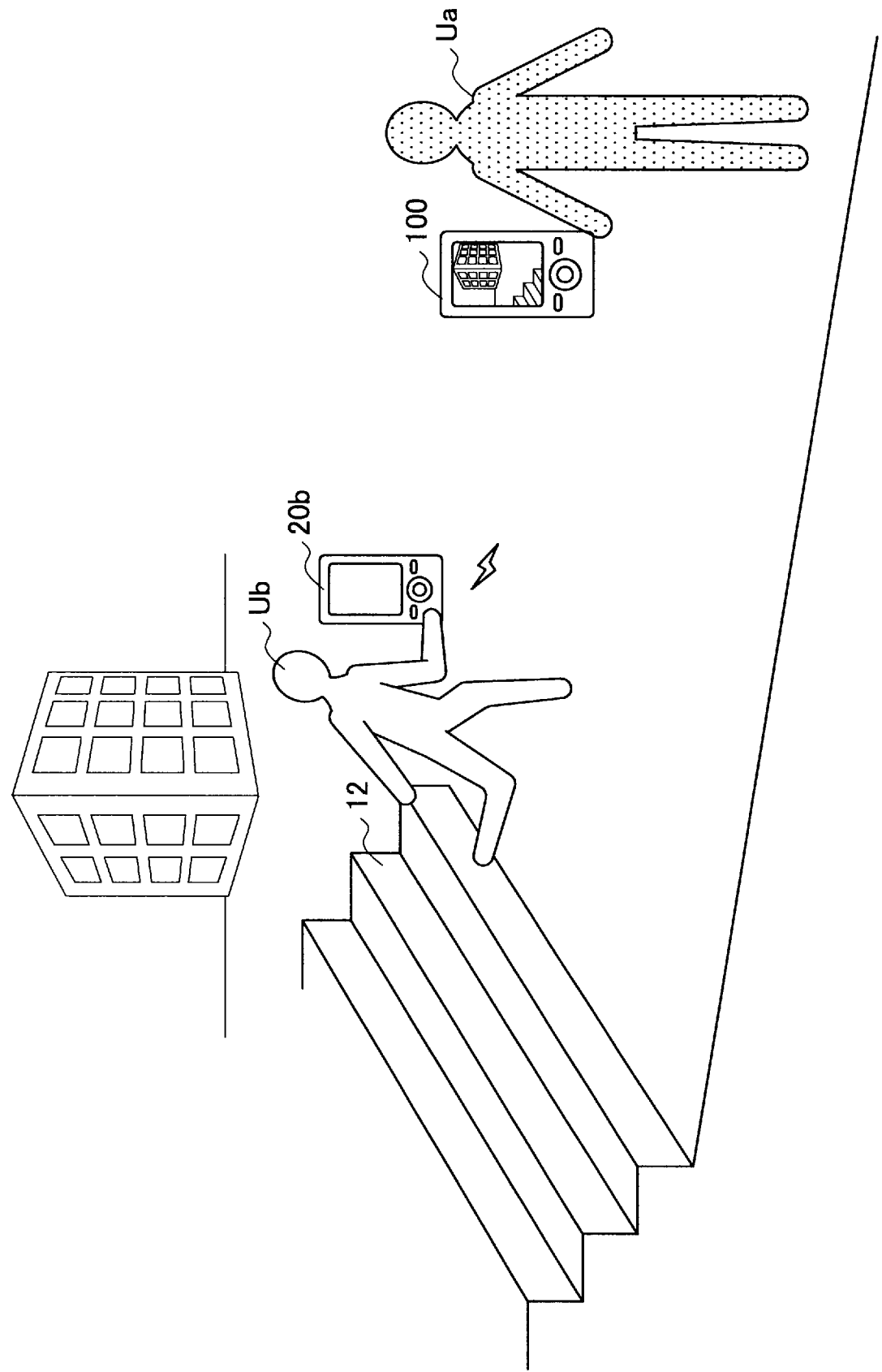

[Fig. 10]
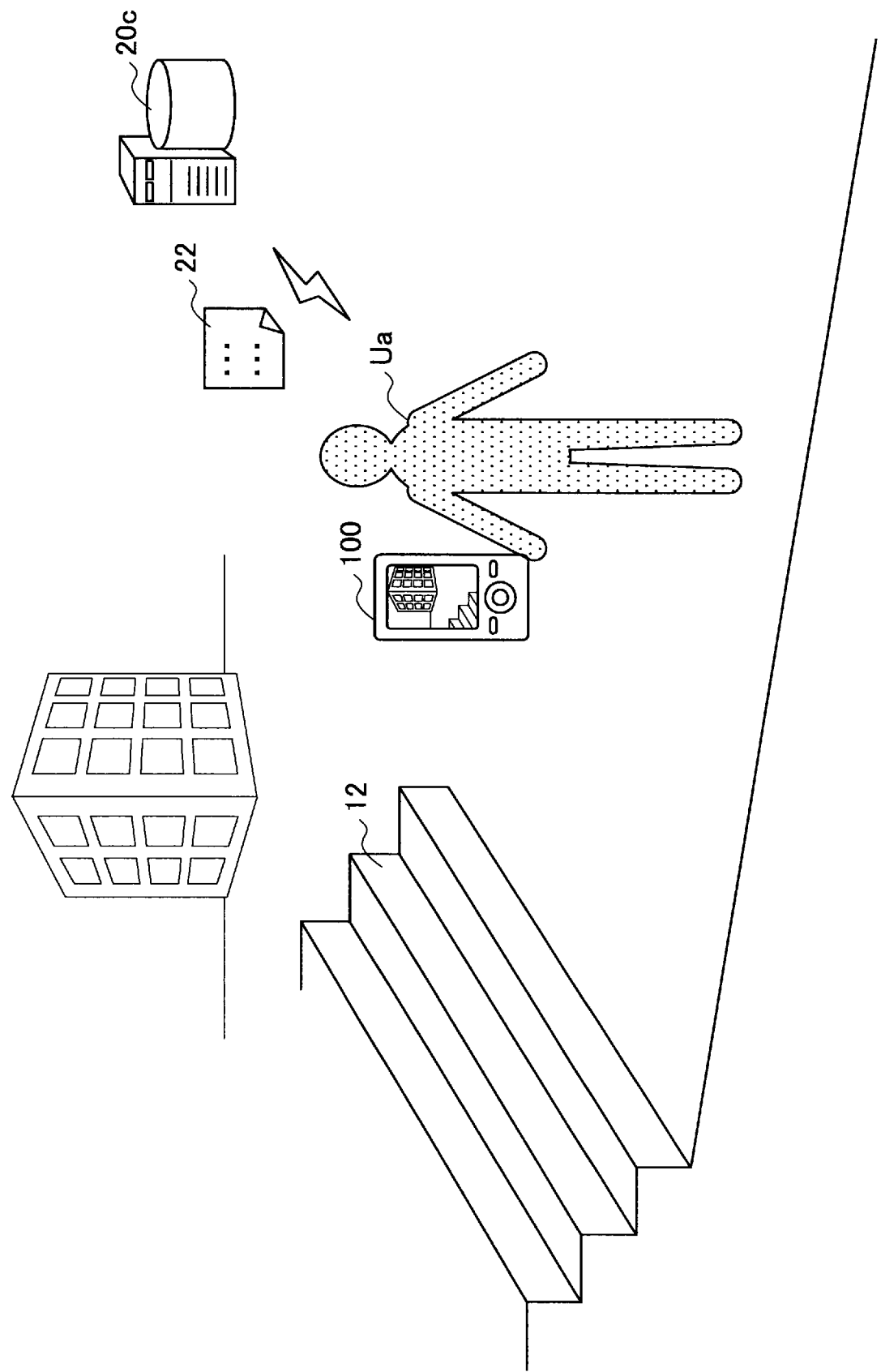

[Fig. 11]
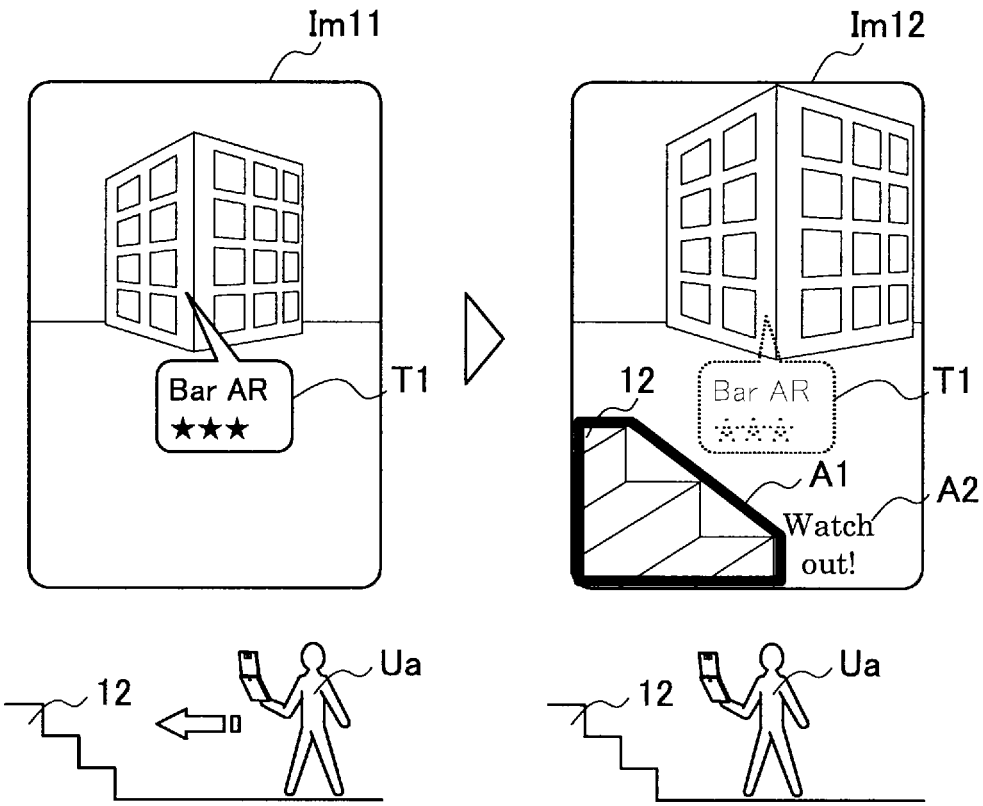
[Fig. 12]
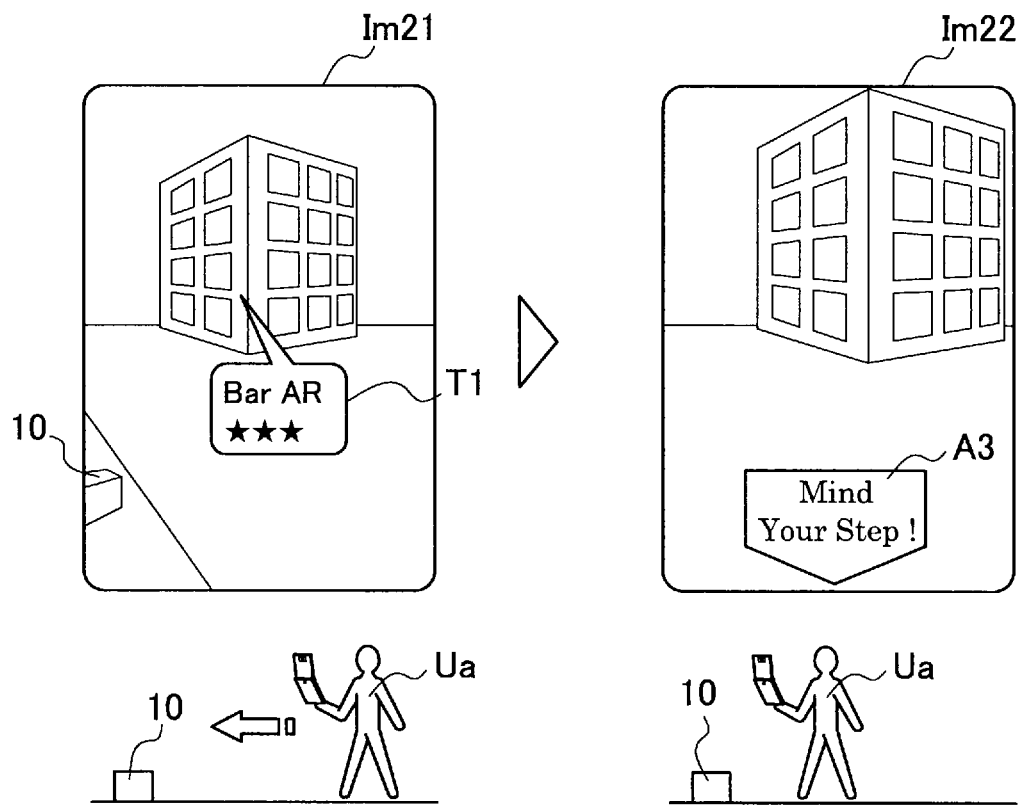

[Fig. 13]
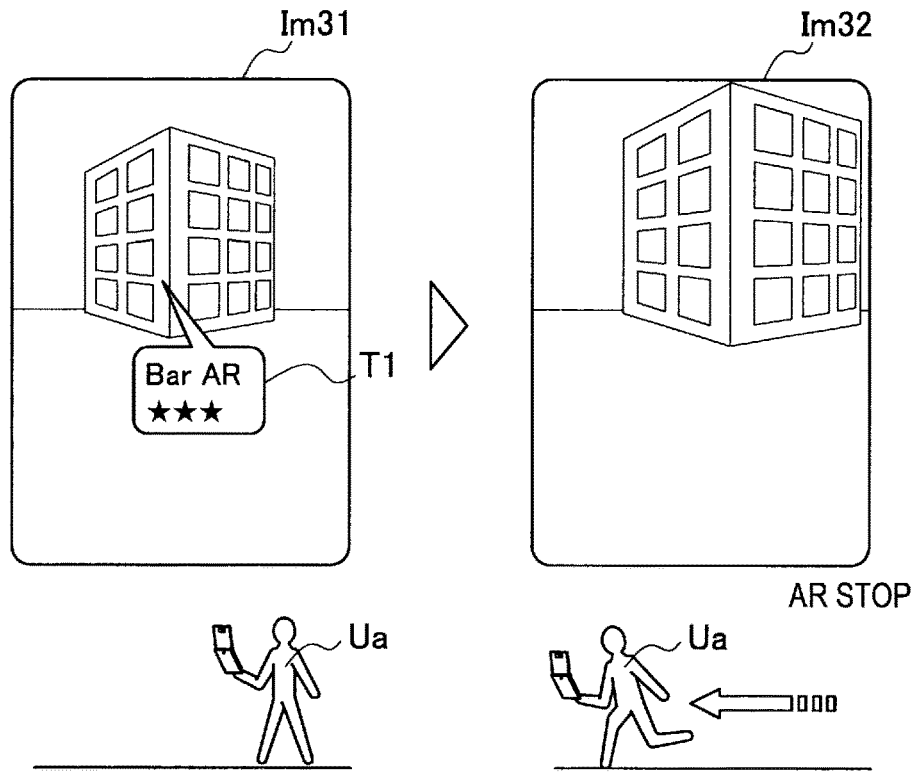
[Fig. 14]
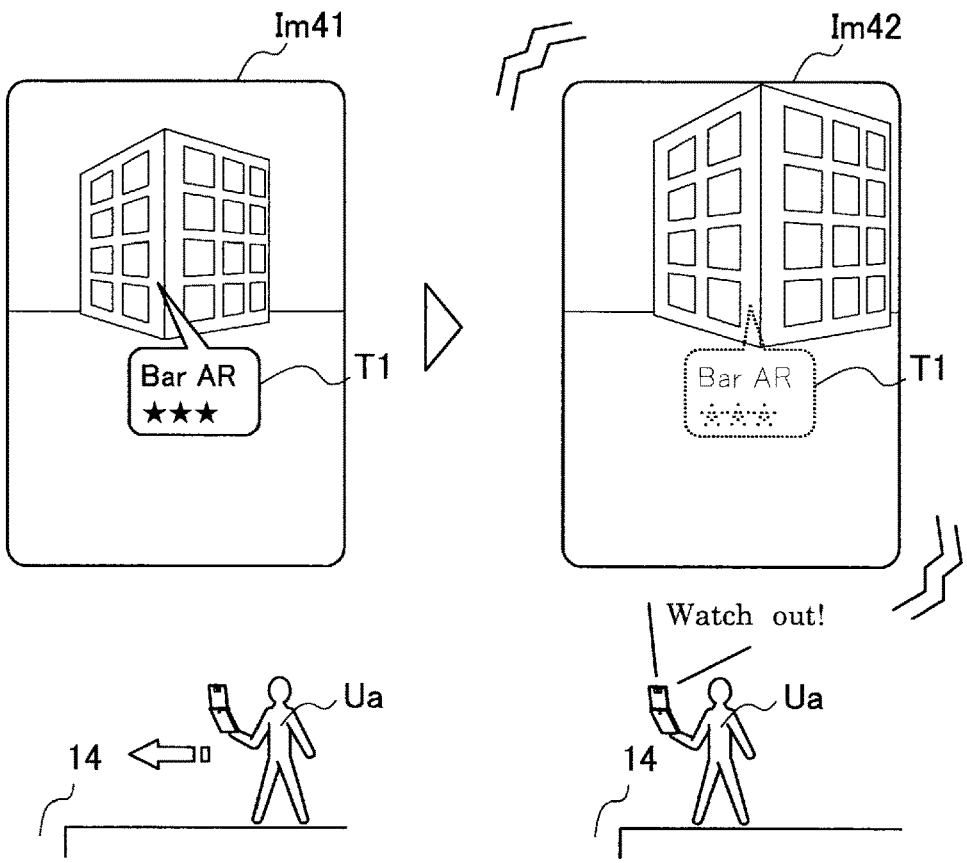

[Fig. 15]
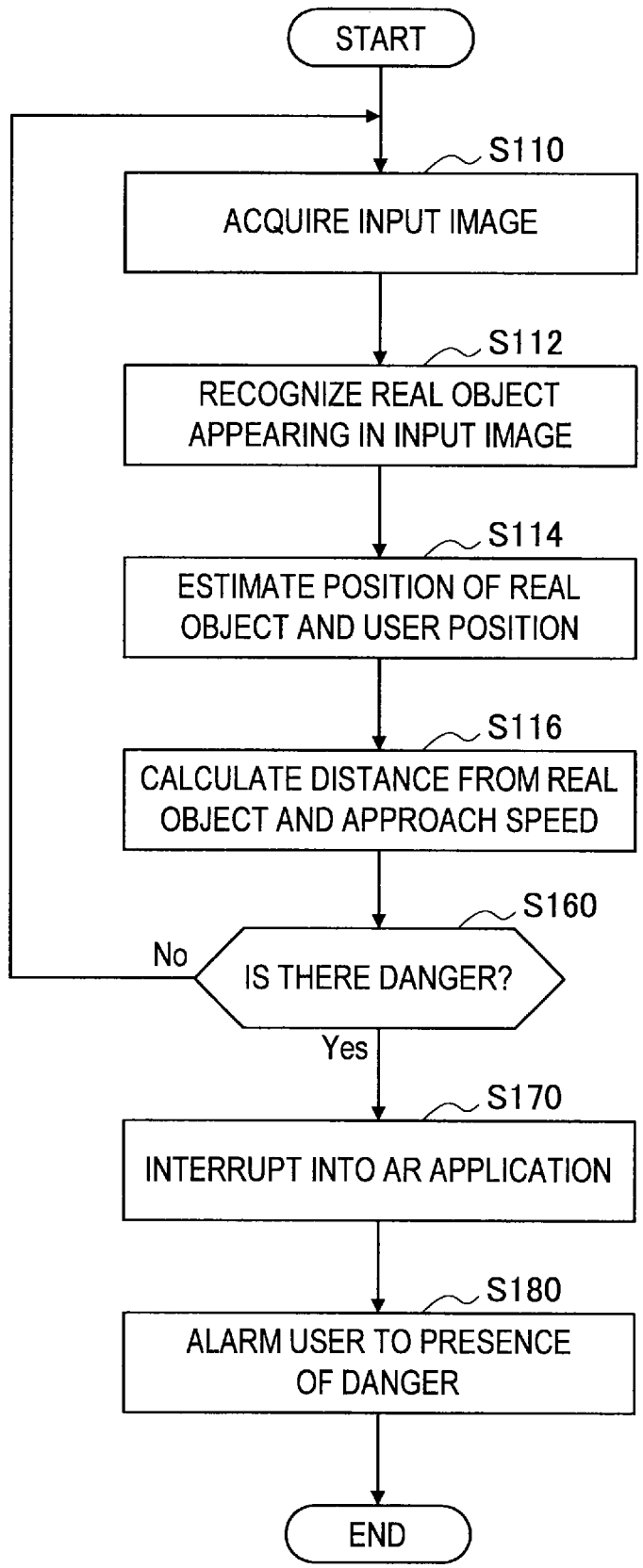

[Fig. 16]
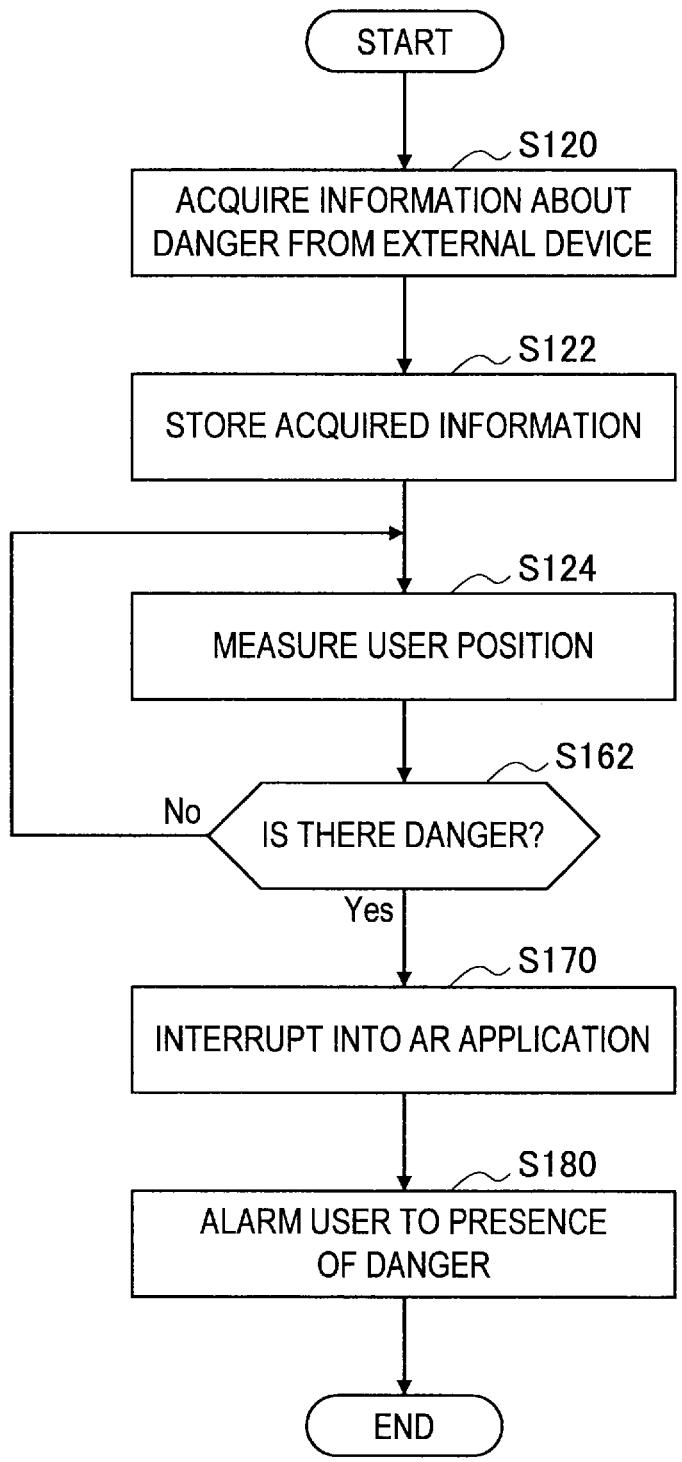

[Fig. 17]
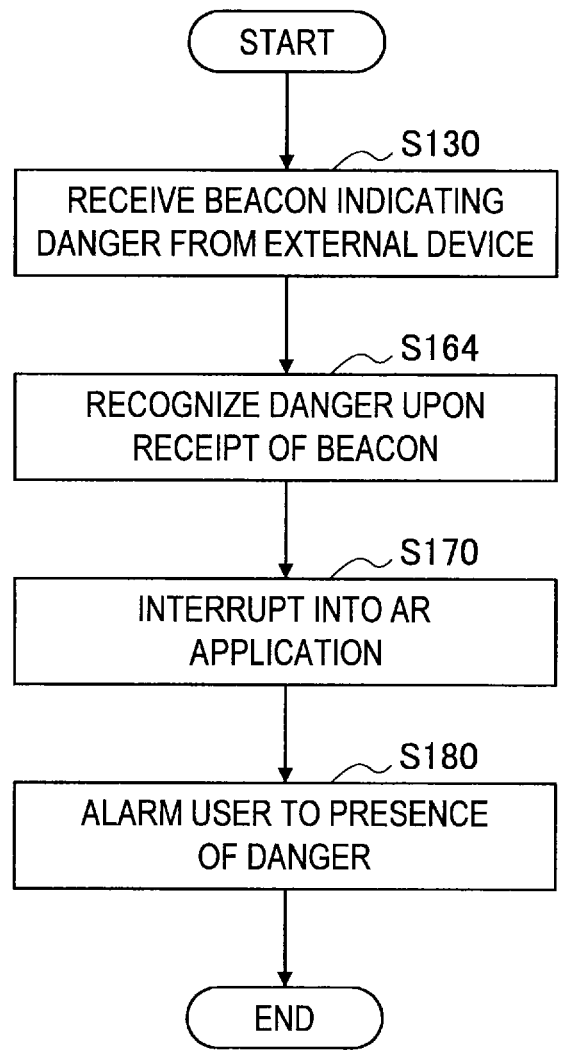

[Fig. 18]
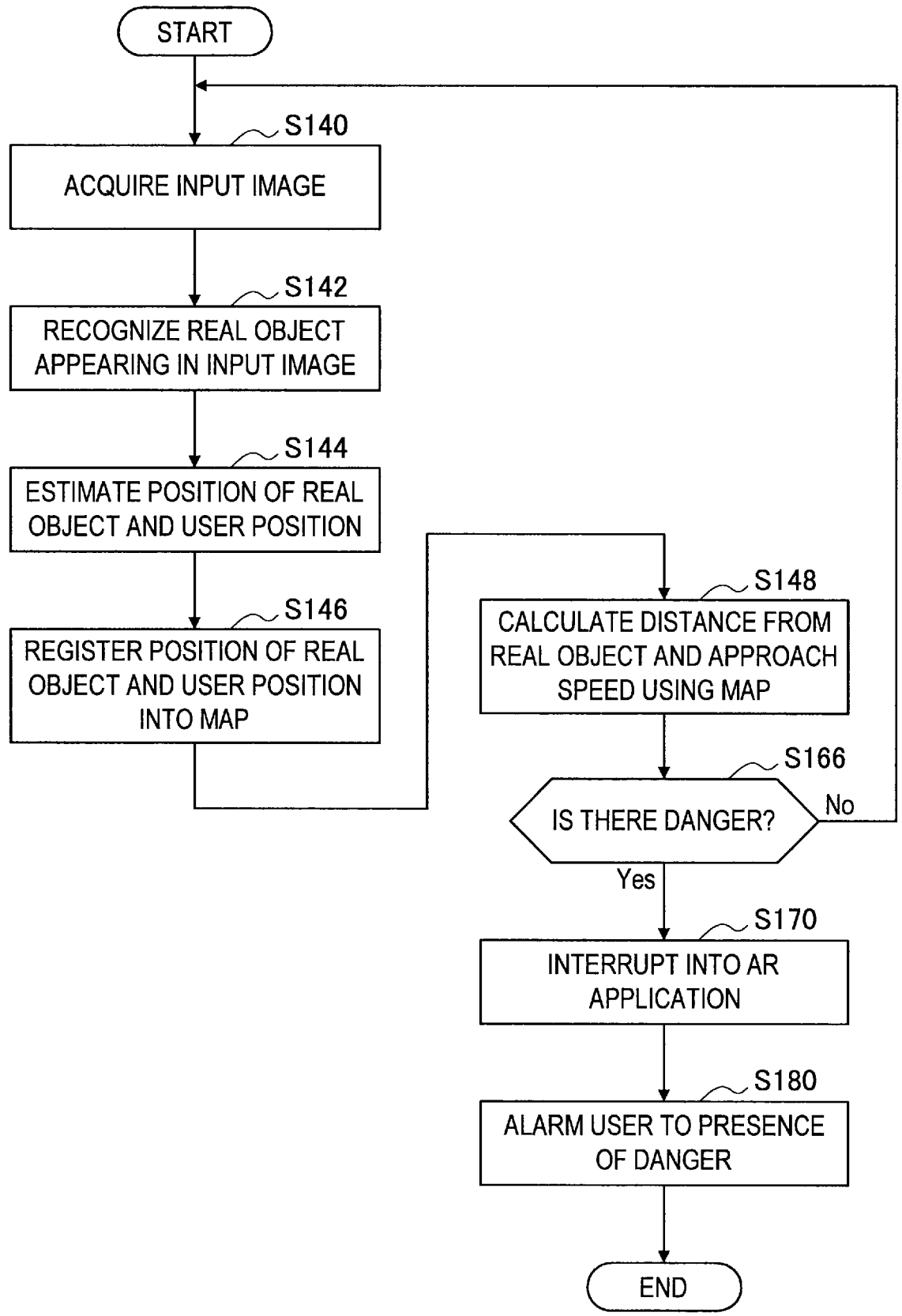

[Fig. 19]
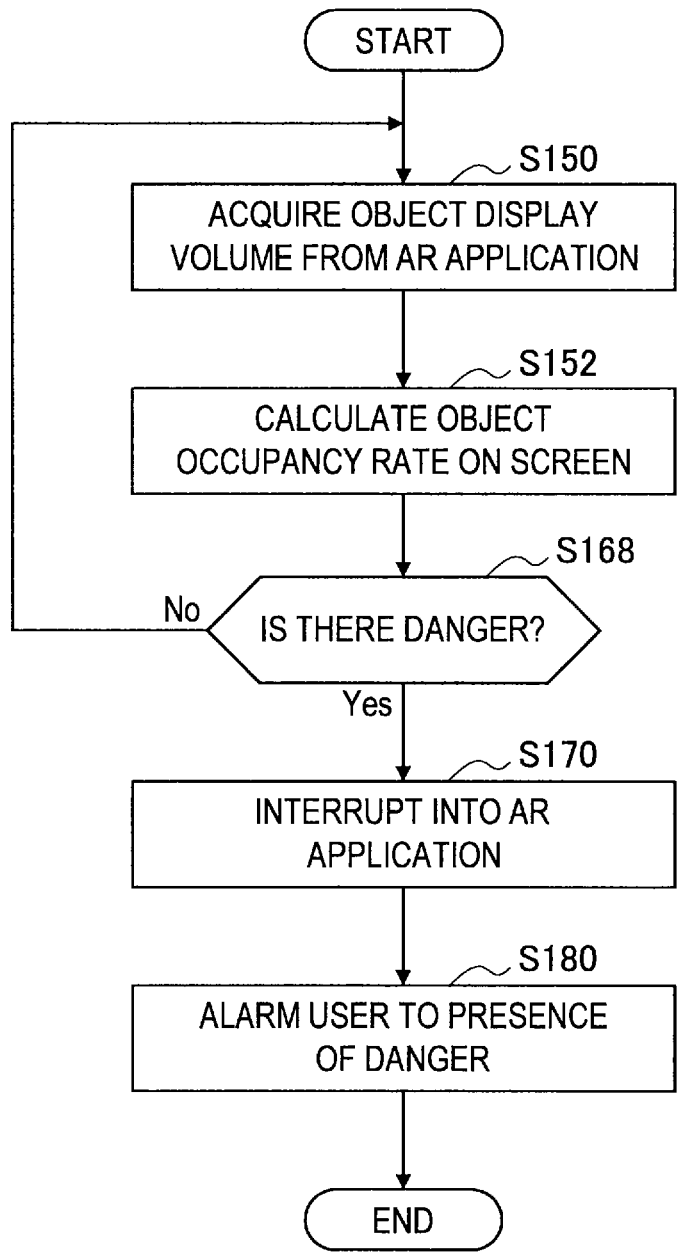

[Fig. 20]
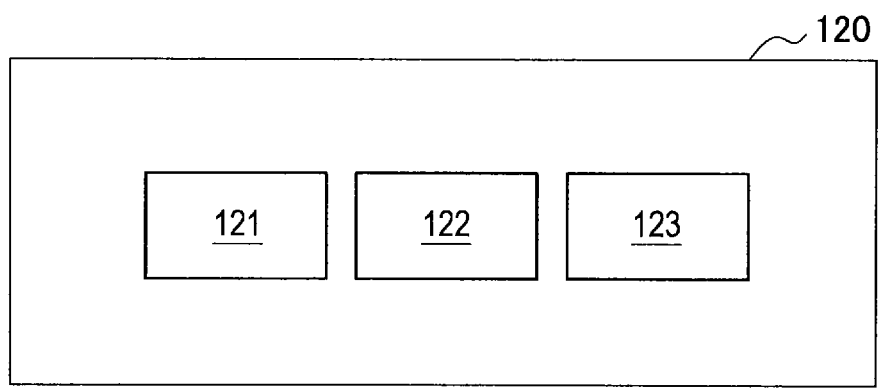

INFORMATION PROCESSING TO NOTIFY POTENTIAL SOURCE OF INTEREST TO USER

TECHNICAL FIELD

The present disclosure contains subject matter related to that disclosed in Japanese Priority Patent Application JP 2011-016441 filed in the Japan Patent Office on Jan. 28, 2011, the entire content of which is hereby incorporated by reference.

The present disclosure relates to an information processing device, an alarm method, and a program.

BACKGROUND ART

Various applications for augmented reality (AR) which add or superimpose additional information onto the real world or real-world images for presentation to a user have been proposed. For example, in an application described in the following Non Patent Literature 1, virtual tags associated with arbitrary positions on a map are registered into a system in advance. Then, in an image captured by a terminal carried by a user, a tag associated with a position appearing in the image is displayed superimposed onto the position.

CITATION LIST

Non Patent Literature

NPL 1: "Sekai Camera Support Center", <online>, <Searched on Dec. 22, 2010>, Internet<URL: http://support.sekaicamera.com/en>

SUMMARY

Technical Problem

During the time that the augmented reality application is being provided, a user's attention is likely to be attracted to an application screen. A screen of the augmented reality application gives a user a feeling of viewing the real world, which is different from a screen of another type of application. This feeling may have consequences and may even be dangerous. Specifically, in actuality, the angle of view of a screen of a mobile terminal or a screen of a head mounted display is narrower than the viewing angle of human vision. Further, there is a possibility that a real object existing in the real world can be hidden from the user's view by additional information of the augmented reality application. This may increase a risk that a user fails to notice (or is late to notice) a danger present in the real world during the time that the augmented reality application is being provided.

In light of the foregoing, it is desirable to provide an information processing device, alarm method and program that reduce the risk of a danger faced by a user in the real world during the time that the augmented reality application is being provided.

Solution to Problem

In one exemplary embodiment, the present disclosure is directed towards an apparatus comprising a memory storing instructions is provided. The apparatus includes a control unit for executing the instructions to send signals to display, for a user, a first virtual image superimposed onto a representation of real space. The control unit further executes instructions to send signals to identify a potential source of interest for the user, the potential source of interest being outside of a user focus area in the representation of real space. The control unit further executes instructions to send signals to notify the user of the potential source of interest.

In another exemplary embodiment, the present disclosure is directed towards a method comprising displaying, for a user, a virtual image superimposed onto a representation of real space. The method further comprises identifying a potential source of interest for the user, the potential source of interest being outside of a user focus area in the representation of real space. The method further comprises notifying the user of the potential source of interest. In another exemplary embodiment, the present disclosure is directed towards a tangibly embodied non-transitory computer-readable medium storing instructions which, when executed by a processor, perform a method comprising displaying, for a user, a virtual image superimposed onto a representation of real space. The method further comprises identifying a potential source of interest for the user, the potential source of interest being outside of a user focus area in the representation of real space. The method further comprises notifying the user of the potential source of interest.

Advantageous Effects of Invention

Information processing devices, alarm methods, the programs according to embodiments of the present disclosure can reduce the risk that a user will overlook a potential source of interest such as, for example, a danger faced by a user in the real world while the augmented reality application is being provided.

BRIEF DESCRIPTION OF DRAWINGS

FIG. 1 is a view showing an example of a situation where an augmented reality application can be used;

FIG. 2 is a block diagram showing an example of a configuration of an information processing device according to embodiments;

FIG. 3 is a block diagram showing an example of a configuration of functions implemented by a control unit of the information processing device according to embodiments;

FIG. 4 is a first explanatory view to describe a layout of an imaging device and a range sensor in the information processing device according to embodiments;

FIG. 5 is a second explanatory view to describe a layout of an imaging device and a range sensor in the information processing device according to embodiments;

FIG. 6 is a view to describe an example of parameters that can be used for recognizing a danger according to embodiments;

FIG. 7 is a view to describe a type of a danger that can be recognized according to embodiments;

FIG. 8 is a view showing a first example of a device that transmits information about a danger according to embodiments;

FIG. 9 is a view showing a second example of a device that transmits information about a danger according to embodiments;

FIG. 10 is a view showing a third example of a device that transmits information about a danger according to embodiments;

FIG. 11 is a view showing a first example of an alarm by an alarm unit according to embodiments;

FIG. 12 is a view showing a second example of an alarm by the alarm unit according to embodiments;

FIG. 13 is a view showing a third example of an alarm by the alarm unit according to embodiments;

FIG. 14 is a view showing a fourth example of an alarm by the alarm unit according to embodiments;

FIG. 15 is a flowchart showing an example of a flow of a danger alarm process in a first scenario;

FIG. 16 is a flowchart showing an example of a flow of a danger alarm process in a second scenario;

FIG. 17 is a flowchart showing an example of a flow of a danger alarm process in a third scenario;

FIG. 18 is a flowchart showing an example of a flow of a danger alarm process in a fourth scenario;

FIG. 19 is a flowchart showing an example of a flow of a danger alarm process in a fifth scenario; and FIG. 20 is a block diagram of one implementation of control unit of FIG. 2.

DESCRIPTION OF EMBODIMENTS

Hereinafter, preferred embodiments of the present disclosure will be described in detail with reference to the appended drawings. Herein, structural elements that have substantially the same function and structure are denoted with the same reference numerals, and repeated explanation of these structural elements may be omitted.

Further, "Description of Embodiments" will be provided in the following order:

1. Overview of Information Processing Device according to embodiments
2. Configuration Example of Information Processing Device According to Embodiments
3. Flow of Process According to An Exemplary Embodiment
4. Summary 1. Overview of Information Processing Device According to Embodiments FIG. 1 is a view showing an example of a situation where an augmented reality (AR) application can be used. Referring to FIG. 1, in a real space 1, a user Ua is walking on a sidewalk, and there are a block 10 and stairs 12 ahead of the user Ua. Further, the user Ua has an information processing device 100. The information processing device 100 is a device capable of providing the AR application. The information processing device 100 may be, for example, a smart phone, a personal computer (PC), a game terminal, a portable music player and the like or other suitable device. During the time that the AR application is being provided to the user Ua by the information processing device 100, the attention of the user Ua may be attracted to the screen of the information processing device 100. The screen of the information processing device 100 may show a representation of the real world. However, because the angle of view of the screen may be narrower than a viewing angle of the user Ua, and additional application is further displayed on the screen a risk increases that the user Ua fails to notice (or is late to notice) an object or other potential source of interest present in the real space 1 during the time that the AR application is being provided. For example, the user may miss a restaurant or store in which the user may have an interest. Other potential sources of interest may include utilities (e.g., elevators, public telephones, public information booths, etc.), places of interest (e.g., hospitals, automobile repair shops, museums, movie theaters, parks, homes of acquaintances, schools, libraries, etc.), or events (e.g., performances or displays). One exemplary category of potential sources of interest to the user includes various objects or places that may present some level of physical danger for the user. The latter example will be used herein to illustrate various aspects of the invention. However, it is to be understood that the present invention is not limited to use with respect to potential sources of user interest that represent a physical danger to the user and can, in fact, be used with any suitable potential source of user interest (e.g., recreational, utilitarian, or otherwise).

As an example of a source of physical danger, the user Ua might trip over the block 10. There is also a possibility that the user Ua might hit the stairs 12. Further, there is a possibility that the user Ua might walk off the sidewalk and go into a driveway or to other dangerous areas. Besides the example shown in FIG. 1, a variety of dangers are present in the real world. The information processing device 100 according to embodiments of the present disclosure alarms a user to the presence of such dangers by the scheme described herein below.

2. Configuration Example of Information Processing Device According to Embodiments 2-1. Hardware Configuration FIG. 2 is a block diagram showing an example of the configuration of the information processing device 100 shown in FIG. 1. Referring to FIG. 2, the information processing device 100 includes an imaging unit 102, a sensor unit 104, a positioning unit 106, a communication unit 108, a storage unit 110, an input unit 112, a display unit 114, a voice output unit 116, a vibration unit 118, a bus 119 and a control unit 120.

Imaging Unit

The imaging unit 102 may include a camera module with an image pickup device such as a charge coupled device (CCD) or a complementary metal oxide semiconductor (CMOS). The imaging unit 102 may image the real space 1 and thereby generate one or more input images. The input images generated by the imaging unit 102 may be used for the provision of the AR application and further used for the estimation of a user position and the estimation of a position of a real object appearing in the input images. The imaging unit 102 may be configured separately from the information processing device 100 and connected to the information processing device 100 at the time of providing the AR application.

Sensor Unit

The sensor unit 104 may include one or more sensors that support the recognition of a danger by the information processing device 100. For example, the sensor unit 104 may include at least one of a gyro sensor, an acceleration sensor and a geomagnetic sensor, and measures the tilt angle, 3-axis acceleration or direction of the information processing device 100. The tilt angle, 3-axis acceleration or direction of the information processing device 100 may be used for estimating the posture of the information processing device 100.

Further, the sensor unit 104 may include a laser or infrared range sensor that measures the distance between a real object in the real space and a user. The range sensor may be capable of measuring the distance along a direction different from the orientation (optical axis) of the imaging unit 102 (see FIG. 4). This may allow the information processing device 100 to recognize the presence of an obstacle (e.g. the block 10) existing at a position that deviates from the angle of view of the information processing device 100 (see FIG. 5). Relative positions of the information processing device 100 and the obstacle can be also estimated based on the distance measured by the range sensor and the posture of the information processing device 100. Note that the range sensor may be mounted facing any direction, not necessarily facing downward as illustrated in FIG. 5.

Positioning Unit

The positioning unit 106 may include a module that measures the position of the information processing device 100. For example, the positioning unit 106 may be a Global Positioning System (GPS) module that receives a GPS signal and measures the latitude, longitude and altitude of the information processing device 100. Alternatively, the positioning unit 106 may be a positioning module such as PlaceEngine (registered trademark) that measures the position of the information processing device 100 based on the strength of a radio signal received from a wireless access point.

Communication Unit

The communication unit 108 may include a communication interface for the information processing device 100 to communicate with another device. For example, the communication unit 108 may receive information about a danger from an external device. Further, the communication unit 108 may transmit information about a danger to a device having a danger alarm function similar or different from the information processing device 100.

Storage Unit

The storage unit 110 may stores programs and data for processing by the information processing device 100 by using a tangibly embodied non-transitory, computer-readable storage medium such as a semiconductor memory, hard disk, CD-ROM, etc. For example, the storage unit 110 may store input images generated by the imaging unit 102, sensor data output from the sensor unit 104, position data measured by the positioning unit 106, and external information received by the communication unit 108. Further, the storage unit 110 may store feature data for a image recognition process, which is described later. The feature data stored in the storage unit 110 is data representing the appearance feature of one or more real objects in the real space.

Input Unit

The input unit 112 may be used by a user of the information processing device 100 to operate the information processing device 100 or input information to the information processing device 100. The input unit 112 may include a keypad, button, switch, touch panel and the like, for example. The input unit 112 may include a gesture recognition module that recognizes the gestures of a user appearing in an input image.

Display Unit

The display unit 114 may include a display module having a screen that displays a virtual object generated by the AR application and superimposed onto the real space. On the screen of the display unit 114, an object for warning to alarm a user to the presence of a danger may be also displayed. The screen of the display unit 114 may be a see-through type or non see-through type. Further, the display unit 114 may be configured separately from the information processing device 100 and/or connected to the information processing device 100 at the time of providing the AR application.

Voice Output Unit

The voice output unit 116 may typically be a speaker that outputs a sound or voice to a user. The voice output unit 116 can be used to alarm a user to the presence of a danger through the auditory sense of the user.

Vibration Unit

The vibration unit 118 may be a vibrator such as an electrically driven eccentric motor. The vibration unit 118 can be used to alarm a user to the presence of a danger through the tactile sense of the user.

Bus

The bus 119 may connect the imaging unit 102, the sensor unit 104, the positioning unit 106, the communication unit 108, the storage unit 110, the input unit 112, the display unit 114, the voice output unit 116, the vibration unit 118, and the control unit 120 with one another.

Control Unit

The control unit 120 may include a processor 121 such as a central processing unit (CPU) or a digital signal processor (DSP), a memory 122, and computer-readable medium 123. One such exemplary control unit 120 is shown in FIG. 20. The control unit 120 may execute instructions forming the program stored in the storage unit 110 to, for example, make various functions of the information processing device 100, which are described below, work.

2-2 Functional Configuration

FIG. 3 is a block diagram showing an example of a configuration of functions that may be implemented by the control unit 120 of the information processing device 100 shown in FIG. 2. Referring to FIG. 3, the control unit 120 may include an application unit 130, an image recognition unit 140, an estimation unit 150, a map storage unit 152, an information acquisition unit 160, a danger recognition unit 170, an alarm unit 180, and a setting unit 190.

Application Unit

The application unit 130 may provide an AR application that displays a virtual object superimposed onto the real space to a user. The AR application provided by the application unit 130 may be an application with any purpose such as navigation, work support, information service or game, for example. The application unit 130 may create a virtual object to be presented to a user in association with a real object appearing in the input image. Then, the application unit 130 outputs an image displaying the created virtual object to the display unit 114. The application unit 130 may determine the display position of the virtual object based on a result of image recognition of the input image.

Image Recognition Unit

The image recognition unit 140 may perform an image recognition process of the input image imaged by the imaging unit 102. For example, the image recognition unit 140 may check feature data extracted from the input image against feature data stored in the storage unit 110 and thereby recognize a real object or region in the real space appearing in the input image. The checking of feature data by the image recognition unit 140 may be done using the Scale-Invariant Feature Transform (SIFT) method described in David G. Lowe, "Distinctive Image Features from Scale-Invariant Keypoints" (the International Journal of Computer Vision, 2004), for example. Further, the checking of feature data by the image recognition unit 140 may be done using the Random Ferns method described in Mustafa Oezuysal et. al., "Fast Keypoint Recognition using Random Ferns" (IEEE Transactions on Pattern Analysis and Machine Intelligence, Vol. 32, Nr. 3, pp. 448-461, March 2010), for example. Furthermore, the image recognition unit 140 may recognize a marker (natural or artificial marker) that shows up in the appearance of in a real object or region in the real space. The image recognition unit 140 may output information (e.g. an identifier and a position or range in the input image) identifying the real object or region recognized as a result of the image recognition to the estimation unit 150.

Estimation Unit

The estimation unit 150 may estimate the position of each real object existing in the real space and the distance between each real object and the imaging unit 102 based on a result of the image recognition by the image recognition unit 140. For example, the estimation unit 150 estimates the distance between each real object and the imaging unit 102 by comparing the actual size of each real object (or marker) and the size in the input image. Then, the estimation unit 150 may estimate the relative position of each real object with respect to the information processing device 100 according to the estimated distance and the position and posture of the imaging unit 102 (the position and posture of the information processing device 100). Further, the estimation unit 150 may dynamically estimate the relative position between each real object in the real space and the information processing device 100 according to the principle of the SLAM technique. The principle of the SLAM technique is described in detail in Andrew J. Davison, "Real-Time Simultaneous Localization and Mapping with a Single Camera" (Proceedings of the 9th IEEE International Conference on Computer Vision Volume 2, 2003, pp. 1403-1410). The distance between a real object in the real space and the information processing device 100 can be assumed to correspond to the distance between a real object in the real space and a user in the recognition of a danger.

Note that the estimation unit 150 may acquire a camera parameter such as a zoom ratio from the imaging unit 102 and correct the estimation result of the position of each real object and the distance from each real object according to the acquired camera parameter.

Map Storage Unit

The map storage unit 152 may store the position of each real object estimated by the estimation unit 150 by using a storage medium such as a semiconductor memory or hard disk. The information processing device 100 can thereby recognize a real object or region once recognized by the image recognition unit 140 even after the real object or region disappears from the input image as the information processing device 100 moves.

Information Acquisition Unit

The information acquisition unit 160 may acquire information about a danger to be used for the recognition of a danger by the danger recognition unit 170. The information about a danger may be previously stored in the storage unit 110 or dynamically acquired from an external device through the communication unit 108.

For example, the information acquisition unit 160 may acquire dangerous region information which defines a dangerous region with a relatively low level of safety in the real space. The dangerous region may be a staircase, escalator, driveway, crossing, platform, construction site and the like, for example. The dangerous region information may include coordinate data indicating an identifier of each dangerous region and a range of each dangerous region.

Further, the information acquisition unit 160 may acquire dangerous object information which defines a dangerous object likely to cause a danger to a user in the real space. The dangerous object may be, for example, a real object which is likely to cause a danger to a user among static objects and dynamic objects in the real space. The dangerous object may be a static obstacle such as an object placed on a road, falling object, advertising display, post or wall, for example. Further, the dangerous object may be a dynamic object that is movable at high speed, such as an automobile, bicycle or train, for example. The dangerous object information may include coordinate data indicating an identifier of each dangerous object, feature data, a position of each dangerous object or the like.

Danger Recognition Unit

The danger recognition unit 170 may recognize a danger faced by a user in the real space. The danger recognition unit 170 may recognize a danger based on a result of the image recognition of the input image which is used for the provision of the AR application. Further, the danger recognition unit 170 may recognize a danger which is not recognized using the input image based on the distance from each real object measured by the range sensor of the sensor unit 104. Further, the danger recognition unit 170 recognizes the position or region in the real space which corresponds to a cause of a danger faced by a user. Upon recognizing a danger, the danger recognition unit 170 outputs information representing the detail of the danger and the corresponding position or region in the real space to the alarm unit 180.

FIG. 6 is a view to describe an example of parameters that can be used by the danger recognition unit 170 in order to recognize a danger according to this embodiment. Referring to FIG. 6, twelve different parameters described herein are shown as an example of parameters that can be used by the danger recognition unit 170.

(1) User Position

The user position is, for example, the position of a user carrying the information processing device 100. The absolute position of a user can be measured by the positioning unit 106 using a GPS signal. Further, the relative position of a user to a nearby real object or region can be estimated by the estimation unit 150 based on a result of the image recognition by the image recognition unit 140. When the absolute position of a nearby landmark is known, the absolute position of a user can be calculated based on the relative position of the user from the landmark and the known position of the landmark. In this embodiment, the user position, the position of the information processing device 100 and the position of the imaging unit 102 can be assumed to be approximately equal to one another.

(2) User's Travel Speed

The user's travel speed can be calculated, for example, from a change in the user position over time. Further, when the sensor unit 104 includes an acceleration sensor, the user's travel speed may be calculated by the integral of an output value of the acceleration sensor.

(3) Position of Static Object

The relative position of a static object can be estimated by the estimation unit 150 based on a result of the image recognition by the image recognition unit 140. The known position of a static object may be previously defined by position data stored in the storage unit 110. Further, the position of a static object may be recognized using position data acquired from an external device, which is described later.

(4) Distance from Static Object

A distance between a static object and a user can be calculated from the relative position of the static object to the user position. Further, a distance between a static object and a user may be measured using a range sensor included in the sensor unit 104.

(5) Approach Speed to Static Object

The approach speed of a user to a static object (or the approach speed of a static object to a user) can be calculated from a change in the distance between the static object and the user over time.

(6) Position of Dynamic Object

The relative position of a dynamic object can be estimated, for example, by the estimation unit 150 based on a result of the image recognition by the image recognition unit 140. Further, the position of a dynamic object may be recognized using position data acquired from an external device, which is described later.

(7) Distance from Dynamic Object

The distance between a dynamic object and a user can be calculated from the relative position of the dynamic object to the user position. Further, the distance between a dynamic object and a user may be measured using a range sensor included in the sensor unit 104.

(8) Approach Speed to Dynamic Object

The approach speed of a user to a dynamic object (or the approach speed of a dynamic object to a user) can be calculated from a change in the distance between the dynamic object and the user over time.

(9) Presence of Dangerous Object

The presence of a dangerous object can be recognized as a result of the image recognition by the image recognition unit 140. Whether the recognized real object is a dangerous object or not may be determined, for example, by checking an identifier of the recognized real object against the list of known identifiers. Alternatively, a real object whose travel speed exceeds a predetermined threshold may be temporarily recognized as a dangerous object.

Further, the presence of a dangerous object may be recognized by receiving a beacon issued in the vicinity of a dangerous object by the communication unit 108. The presence of a nearby dangerous object which does not appear in the input image may be recognized from the distance between the user position and the position of a dangerous object stored in the map storage unit 152.

(10) Position of Dangerous Object

The position of a dangerous object can be recognized in the same manner as the position of a static object or the position of a dynamic object.

(11) Range of Dangerous Region

The range of a dangerous region can be recognized as a result of the image recognition by the image recognition unit 140. The range of a dangerous region may be previously defined by dangerous region information stored in the storage unit 110. Further, the range of a dangerous region may be recognized using dangerous region information acquired from an external device.

(12) Object Occupancy Rate

The object occupancy rate is a parameter representing the proportion of a displayed virtual object on a screen. The danger recognition unit 170 acquires information indicating the display volume of a virtual object (e.g. the total value of the size of a virtual object on a screen), for example, from the application unit 130. Then, the danger recognition unit 170 calculates the object occupancy rate by dividing the display volume of the virtual object by the size of the input image (or the screen size).

The danger recognition unit 170 recognizes a danger faced by a user in the real space by using at least one of the twelve parameters described above.

FIG. 7 is a view to describe a type of a danger that can be recognized by the danger recognition unit 170 according to this embodiment. It should be noted that a source of "danger" is meant to provide a particular example of an object of interest to the user. Referring to FIG. 7, a danger that can be recognized by the danger recognition unit 170 is classified into five types: "collision with static object", "collision with dynamic object", "approach to dangerous object", "approach/entry into dangerous region", and "inhibition of user's attention."

(1) Collision with Static Object

When the distance between a certain static object and a user falls below a predetermined threshold, for example, the danger recognition unit 170 may determine that there is a possibility that the user might collide with the object. Further, when the approach speed to a certain static object exceeds a predetermined threshold, the danger recognition unit 170 may determine that there is a possibility that the user might collide with the object. Then, the danger recognition unit 170 can recognize the presence of the static object which is likely to collide with the user as a danger.

(2) Collision with Dynamic Object

When the distance between a certain dynamic object and a user falls below a predetermined threshold, for example, the danger recognition unit 170 may determine that there is a possibility that the user might collide with the object. Further, when the approach speed to a certain dynamic object (or the approach speed of the dynamic object to a user) exceeds a predetermined threshold, the danger recognition unit 170 may determine that there is a possibility that the user might collide with the object. The threshold for the determination about a dynamic object may be different from the above-described threshold for the determination about a static object. Then, the danger recognition unit 170 can recognize the presence of the dynamic object which is likely to collide with the user as a danger.

(3) Approach to Dangerous Object

The danger recognition unit 170 may recognize the approach of a user to a dangerous object as a danger. The danger recognition unit 170 can determine that a user has approached a dangerous object when detecting the presence of a dangerous object by the image recognition or by the receipt of a beacon from the dangerous object. Further, the danger recognition unit 170 can determine that a user has approached a dangerous object by comparing the distance between the dangerous object and the user with a predetermined threshold.

(4) Approach/Entry into Dangerous Region

The danger recognition unit 170 may recognize the approach or entry of a user into a dangerous region as a danger. The danger recognition unit 170 can determine that a user has entered a dangerous region when the current user position is within the dangerous region. Further, the danger recognition unit 170 can determine that a user has approached a dangerous region by comparing the distance between the boundary of the dangerous region and the current user position with a predetermined threshold. Further, the danger recognition unit 170 may recognize a region where the level of a floor (or ground) largely varies as a dangerous region.

(5) Inhibition of User's Attention

The danger recognition unit 170 may recognize a state in which the user's attention can be inhibited as a danger. The danger recognition unit 170 may determine that the user's attention can be inhibited by the AR application when the above-described object occupancy rate exceeds a predetermined threshold. Further, the danger recognition unit 170 may determine that the user's attention can be inhibited when the user's travel speed exceeds a predetermined threshold.

When the danger recognition unit 170 recognizes a danger which applies to any of the above-described five types, it may output information representing the detail of the recognized danger (e.g. the type of the danger, the identifier or name of the dangerous object or dangerous region etc.) and the corresponding position or region in the real space to the alarm unit 180.

Example of External Device

The capability of the information processing device 100 to recognize a danger can be enhanced by providing information about a danger from an external device to the information processing device 100. FIGS. 8 to 10 show examples of such an external device.

Referring to FIG. 8, a radio transmitter 20a is placed on the stairs 12. The stairs 12 are a real object or region which is likely to cause a danger to the user Ua. The radio transmitter 20a may transmit periodically a beacon for notifying a danger to a nearby device. The beacon may contain the identifier and position data of the stairs 12. When the beacon is received by the communication unit 108, the information acquisition unit 160 of the information processing device 100 acquires information contained in the beacon as external information, and outputs the acquired information to the danger recognition unit 170. The danger recognition unit 170 can thereby recognize the presence of the stairs 12 and its position.

Referring to FIG. 9, a user Ub may carry an information processing device 20b. The information processing device 20b is a device having an equivalent danger alarm function to the information processing device 100. The user Ub is running in the direction where the user Ua is. The information processing device 20b may recognize that the travel speed of the user Ub exceeds a predetermined threshold and transmits a beacon for notifying a danger to a nearby device. The beacon may contain the identifier, position data and speed data of the information processing device 20b, for example. When the beacon is received by the communication unit 108, the information acquisition unit 160 of the information processing device 100 acquires information contained in the beacon as external information, and outputs the acquired information to the danger recognition unit 170. The danger recognition unit 170 can thereby recognize that there is a possibility that the user Ua might collide with the user Ub.

Referring to FIG. 10, a data server 20c may be capable of communication with the information processing device 100 is shown. The data server 20c is a server that stores data identifying a real object or region likely to cause a danger to a user (e.g. the identifier of a real object or region) in association with position data. The data stored in the data server 20c corresponds to the above-described dangerous object information and dangerous region information, for example. The information acquisition unit 160 of the information processing device 100 downloads the dangerous object information and dangerous region information (download data 22 in FIG. 10) from the data server 20c. The danger recognition unit 170 can thereby recognize a danger using the downloaded dangerous object information and dangerous region information Alarm Unit The alarm unit 180 may alarm a user to the presence of a danger when, for example, a danger is recognized by the danger recognition unit 170 during the time that the AR application is being provided to the user. For example, an alarm by the alarm unit 180 may be made by controlling the display of the AR application. To be more specific, in this embodiment, when a danger is recognized by the danger recognition unit 170, the alarm unit 180 interrupts into the AR application. Then, the alarm unit 180 controls the display of the AR application. The control of the display of the AR application may be simply suspending or terminating the AR application. Further, the alarm unit 180 may turn down the display of a virtual object being displayed in the AR application. As an example, the alarm unit 180 makes the displayed virtual object flashing or translucent. Further, the alarm unit 180 may display an object for warning on the screen of the display unit 114 where the AR application is provided. The object for warning may be an object that indicates the position or region of a danger recognized by the danger recognition unit 170 to a user, for example.

Alternatively, or additionally, an alarm by the alarm unit 180 may be made by a means other than the control of the display of the AR application. For example, the alarm unit 180 may alarm a user to the presence of a danger by outputting a warning sound or warning message from the voice output unit 116. Further, the alarm unit 180 may alarm a user to the presence of a danger by vibrating the vibration unit 118.

The alarm unit 180 may be a function that is incorporated into the information processing device 100 independently without depending on the AR application. Alternatively, any of the AR applications installed into the information processing device 100 may have a function as the alarm unit 180.

FIGS. 11 to 14 show examples of the alarm of the presence of a danger by the alarm unit 180 in this embodiment.

(1) First Example

An image Im11 on the left of FIG. 11 is an example of an output image that can be displayed by the AR application. In the image Im11, a virtual object T1 is displayed superimposed onto a building in the real space. The virtual object T1 is an object representing information about the rating of a restaurant in the building, for example.

An image Im12 on the right of FIG. 11 is an example of an output image when an alarm is made by the alarm unit 180 as a result that the user Ua has approached the stairs 12 after the image Im11 is displayed. In the image Im12, the virtual object T1 is displayed translucent. A real object or region which is likely to cause a danger is thereby not hidden by the virtual object T1. Further, an object A1 indicating the position (region) of the stairs to the user and an object A2 indicating a message to alert the user are displayed. The user can thereby recognize a danger faced by him/her quickly and accurately.

(2) Second Example

An image Im21 on the left of FIG. 12 is an example of an output image that can be displayed by the AR application. In the image Im21 also, the virtual object T1 is displayed superimposed onto a building in the real space. Further, the block 10 which is likely to be an obstacle to the user Ua is appearing in the image Im21.

An image Im22 on the right of FIG. 12 is an example of an output image when an alarm is made by the alarm unit 180 as a result that the user Ua has approached the block 10 after the image Im21 is displayed. In the image Im22, the virtual object T1 is deleted from the screen. Further, an object A3 indicating the position of the block 10 to the user and further indicating a message to alert the user is displayed. Although the block 10 deviates from the angle of view of the screen, the danger recognition unit 170 can recognize a danger caused to the user Ua by the block 10 because a range sensor of the sensor unit 104 measures the distance from the block 10 or the map storage unit 152 stores the position of the block 10.

(3) Third Example

An image Im31 on the left of FIG. 13 is an example of an output image that can be displayed by the AR application. In the image Im31 also, the virtual object T1 is displayed superimposed onto a building in the real space.

An image Im32 on the right of FIG. 13 is an example of an output image when an alarm is made by the alarm unit 180 as a result that the user Ua has begun to run after the image Im31 is displayed. In the image Im32, the virtual object T1 is deleted from the screen, and the AR application is terminated. In this manner, the alarm unit 180 may alert the user by simply suspending or terminating the AR application.

(4) Fourth Example

An image Im41 on the left of FIG. 14 is an example of an output image that can be displayed by the AR application. In the image Im41 also, the virtual object T1 is displayed superimposed onto a building in the real space. Further, a ditch 14 exists ahead of the user Ua. The ditch 14 can be also recognized as a dangerous object or dangerous region.

An image Im42 on the right of FIG. 14 is an example of an output image when an alarm is made by the alarm unit 180 as a result that the user Ua has approached the ditch 14 after the image Im41 is displayed. In the image Im42 also, the virtual object T1 is displayed translucent. Further, the alarm unit 180 vibrates the vibration unit 118 and outputs a warming message from the voice output unit 116. In this manner, by making an alarm through the auditory sense or the tactile sense, not only a visual alarm, it is possible to alert the user more strongly.

Setting Unit

The setting unit 190 may manage setting related to the danger recognition process by the danger recognition unit 170 and the alarm process by the alarm unit 180. For example, the setting unit 190 manages by which way an alarm should be made when a danger is recognized by the danger recognition unit 170. The setting unit 190 may make setting so that the alarm unit 180 makes an alarm in different ways for each type of a recognized danger. Further, the setting unit 190 may prompt a user to specify the way of alarm through the input unit 112.

Further, the setting unit 190 may hold the upper limit of the number of times of alarming a user to the same danger, for example. The alarm unit 180 counts the number of times of making an alarm for each identifier or position of a dangerous object and a dangerous region. Then, the alarm unit 180 may refrain from alarming a user to the presence of a danger for which an alarm has been already made to the user the number of times equal to the upper limit. Further, the setting unit 190 records a user's action history, for example. The user's action history may be a history of movement of a user measured by the positioning unit 106, for example. Then, the alarm unit 180 may refrain from alarming a user to the presence of a danger when the user is performing an action similar to an action contained in the user's action history. By disabling the alarm in this manner, it is possible to prevent excessive alarms from being made for a danger already recognized by the user.

Further, the setting unit 190 may prompt a user to specify the identifier or position of a dangerous object or dangerous region for which an alarm should be disabled in advance through the input unit 112. In this case, an alarm by the alarm unit 180 is disabled for a dangerous object or dangerous region explicitly specified by the user.

3. Flow of Process According to Embodiments

Examples of a flow of a process by the information processing device 100 according to this embodiment are described hereinafter, for each of exemplary five scenarios, with reference to FIGS. 15 to 19. Note that the information processing device 100 may execute only one process of the five scenarios or execute a plurality of processes. Further, the information processing device 100 may execute a process with a different flow from the processes described as examples below.

3-1. First Scenario

FIG. 15 is a flowchart showing an example of a flow of a danger alarm process in a first scenario. In the first scenario, the recognition of a danger based on a result of image recognition on an input image is performed.

Referring to FIG. 15, an input image is first acquired by the image recognition unit 140 (Step S110). Next, the image recognition unit 140 recognizes a real object appearing in the acquired input image (Step S112). Then, the estimation unit 150 estimates the position of each real object recognized by the image recognition unit 140 and the user position (Step S114). Then, the estimation unit 150 calculates the distance between each real object and the user based on the estimated position of each real object and user position, and further calculates the user's approach speed to each real object (Step S116).

Then, the danger recognition unit 170 may determine whether there is a danger by comparing the distance between each real object and the user and the user's approach speed to each real object respectively estimated and calculated by the estimation unit 150 with predetermined thresholds (Step S160). For example, when the user's approach speed to a certain real object exceeds a predetermined threshold, the danger recognition unit 170 can determine that there is a possibility that the user might collide with the real object. Further, when the distance between a certain dangerous object and the user falls below a predetermined threshold, the danger recognition unit 170 can determine that the user is approaching the dangerous object.

When the danger recognition unit 170 determines that there is a danger in Step S160, the alarm unit 180 interrupts into the AR application being provided by the application unit 130 (Step S170). Then, the alarm unit 180 alarms the user to the presence of a danger by the way illustrated in FIGS. 11 to 14 or another way (Step S180). On the other hand, when the danger recognition unit 170 determines that there is no danger in Step S160, the process returns to Step S110.

3-2. Second Scenario

FIG. 16 is a flowchart showing an example of a flow of a danger alarm process in a second scenario. In the second scenario, the recognition of a danger using information about a danger received from a data server is performed.

Referring to FIG. 16, the information acquisition unit 160 first acquires information about a danger from an external device through the communication unit 108 (Step S120). In this example, it is assumed that dangerous object information defining a dangerous object and dangerous region information defining a dangerous region are acquired from the data server 20c illustrated in FIG. 10. The information acquisition unit 160 stores the dangerous region information acquired in Step S120 into the storage unit 110 (Step S122). Then, the positioning unit 106 measures a user position (Step S124). In Step S124, the user position may be estimated by the estimation unit 150 based on a result of image recognition of the input image, instead of that the user position is measured by the positioning unit 106.

Then, the danger recognition unit 170 may determine whether there is a danger based on the dangerous region information and dangerous object information and the user position (Step S162). For example, when the user position is included in the range of a dangerous region indicated by the dangerous region information, or when the distance between the boundary of the dangerous region and the user position falls below a predetermined threshold, the danger recognition unit 170 can determine that the user has entered or is approaching the dangerous region. Further, when the distance between the position of a dangerous object indicated by the dangerous object information and the user position falls below a predetermined threshold, the danger recognition unit 170 can determine that there is a dangerous object near the user.

When the danger recognition unit 170 determines that there is a danger in Step S162, the alarm unit 180 interrupts into the AR application being provided by the application unit 130 (Step S170). Then, the alarm unit 180 may alarm the user to the presence of a danger by the way illustrated in FIGS. 11 to 14 or another way (Step S180). On the other hand, when the danger recognition unit 170 determines that there is no danger in Step S162, the process returns to Step S124.

3-3. Third Scenario

FIG. 17 is a flowchart showing an example of a flow of a danger alarm process in a third scenario. In the third scenario, the recognition of a danger based on information received from an external device different from a data server is performed.

Referring to FIG. 17, the information acquisition unit 160 first acquires information about a danger from an external device through the communication unit 108 (Step S130). In this example, it is assumed that a beacon notifying a danger is received from the radio transmitter 20a illustrated in FIG. 8 or the information processing device 20b illustrated in FIG. 9. When the information acquisition unit 160 receives the beacon notifying a danger, the danger recognition unit 170 recognizes a danger (Step S164). The danger recognition unit 170 may recognize a danger immediately upon receipt of the beacon or determine whether there is a danger based on position data contained in the beacon and a user position.

When the danger recognition unit 170 recognizes a danger in Step S164, the alarm unit 180 interrupts into the AR application being provided by the application unit 130 (Step S170). Then, the alarm unit 180 alarms the user to the presence of a danger by the way illustrated in FIGS. 11 to 14 or another way (Step S180).

3-4. Fourth Scenario

FIG. 18 is a flowchart showing an example of a flow of a danger alarm process in a fourth scenario. In the fourth scenario, the recognition of a danger using a map created based on a result of image recognition of the input image is performed.

Referring to FIG. 18, an input image is first acquired by the image recognition unit 140 (Step S140). Next, the image recognition unit 140 recognizes a real object appearing in the acquired input image (Step S142). Then, the estimation unit 150 estimates the position of each real object recognized by the image recognition unit 140 and the user position (Step S144). Then, the estimation unit 150 stores the estimated position of each real object and the user position into the map storage unit 152 (Step S146). After that, the estimation unit 150 calculates the distance between the position of each real object stored in the map storage unit 152 and the latest user position, and further calculates the user's approach speed to each real object (Step S148).

Then, the danger recognition unit 170 determines whether there is a danger by comparing the distance between each real object and the user and the user's approach speed to each real object respectively estimated and calculated by the estimation unit 150 with predetermined thresholds (Step S166). When the danger recognition unit 170 determines that there is a danger, the alarm unit 180 interrupts into the AR application being provided by the application unit 130 (Step S170). Then, the alarm unit 180 may alarm the user to the presence of a danger by the way, for example, illustrated in FIGS. 11 to 14 or another way (Step S180). On the other hand, when the danger recognition unit 170 determines that there is no danger in Step S166, the process returns to Step S140.

3-5. Fifth Scenario

FIG. 19 is a flowchart showing an example of a flow of a danger alarm process in a fifth scenario. In the fifth scenario, the recognition of a danger using information acquired from the application unit 130 is performed.

Referring to FIG. 19, the danger recognition unit 170 first acquires information indicating the display volume of a virtual object from the application unit 130 (Step S150). Then, the danger recognition unit 170 calculates the object occupancy rate by dividing the display volume of the virtual object by the size of the input image (or the screen size) (Step S152).

Then, the danger recognition unit 170 may determine whether there is a danger by comparing the object occupancy rate with a predetermined threshold (S168). When the danger recognition unit 170 determines that there is a danger, the alarm unit 180 interrupts into the AR application being provided by the application unit 130 (Step S170). Then, the alarm unit 180 may alarm the user to the presence of a danger by the way illustrated in FIGS. 11 to 14 or another way (Step S180). On the other hand, when the danger recognition unit 170 determines that there is no danger in Step S168, the process returns to Step S150.

4. Summary

Various embodiments of the present disclosure are described in detail above with reference to FIGS. 1 to 19. The information processing device 100 according to these embodiments alarms a user to the presence of a danger when a danger faced by the user is recognized in the real space during the time that an AR application is being provided to the user. This reduces the risk of a danger faced by the user in the real world. As a result, the user can use the AR application with less worry.

Further, according to an embodiment, an alarm to a user can be made by controlling the display of the AR application. The user of the AR application can thereby recognize a danger promptly without missing the alarm.

Further, according to an embodiment, an alarm can be made by interrupting into the AR application. Therefore, regardless of the type of the AR application installed into the information processing device 100, it is possible to alarm a user to the presence of a danger during the time that the AR application is being provided. Further, the above-described alarm function may be implemented as an independent function which is not dependent on any AR application. In this case, there may not be a need for each AR application to take measures to reduce the risk of a danger, so that the flexibility of the development of AR applications can be enhanced.

Further, according to an embodiment, a danger faced by a user can be recognized based on a result of the image recognition of the input image which is used for the provision of the AR application. Specifically, a parameter such as the distance between a real object in the real space and a user, the user's approach speed to each real object, or the user's travel speed is estimated based on a result of the image recognition. Then, a danger may be recognized using the estimated parameter. In this case, the above-described danger alarm process can be easily achieved by extending a device capable of providing the AR application at low cost.

Further, according to an embodiment, the presence of an obstacle which is likely to collide with a user in the real space can be recognized as a danger. This reduces the risk that a user collides with an obstacle while the user's attention is being attracted to the AR application.

Further, according to an embodiment, the approach or entry of a user to a dangerous region or the approach to a dangerous object can be also recognized as a danger. This reduces the risk that a user approaches or enters a dangerous region, or a user approaches a dangerous object while the user's attention is being attracted to the AR application.

Further, according to an embodiment, information about a danger can be provided from an external device. When information defining a dangerous region or dangerous object is provided from a data server, the danger recognition capability of the information processing device 100 is enhanced compared with the case where the information processing device 100 recognizes a danger by itself. Further, when a device of another user having an equivalent danger alarm function to the information processing device 100 provides information about a danger, a danger can be recognized with higher reliability by the cooperation between the devices. Furthermore, when a device that issues information about a danger is placed in a real object or region which is likely to cause a danger, a danger can be recognized with still higher reliability in a location with a high degree of danger.

Further, according to an embodiment, a range sensor capable of measuring a distance from a real object in the real space along a direction different from the optical axis of an imaging device is used for the recognition of a danger. This may enable recognition of a danger which is not recognizable by the image recognition only.

Further, according to an embodiment, whether the user's attention is inhibited or not is determined based on the proportion of a displayed virtual object on a screen. This reduces the risk that a user is late to notice a danger present in the real world due to too many virtual objects displayed on the screen.

Further, according to an embodiment, an alarm which is unnecessary for a user is disabled based on the number of times of alarms, user's action history, or explicit setting by a user. This prevents that the use of the AR application by the user is inhibited by an unwanted alarm for the user.

Further, according to an embodiment, the AR application can be suspended or terminated upon recognition of a danger. In this case, the user's attention can be more reliably drawn to the recognized danger. Further, a virtual object being displayed by the AR application can be flashing or translucent. Therefore, the presence of a danger appearing in the input image is not completely hidden by the virtual object.

Further, according to an embodiment, an object for warning can be displayed on a screen upon recognition of a danger. The object for warning can alarm a user to the position or region of the recognized danger. A user can thereby recognize the cause of the danger promptly.

Although preferred embodiments of the present disclosure are described above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the present technology can adopt the following configurations.

(1)

An information processing device capable of providing to a user an augmented reality application that displays a virtual object superimposed onto a real space, comprising:
a danger recognition unit that recognizes a danger faced by the user in the real space; and
an alarm unit that alarms the user to a presence of a danger when a danger is recognized by the danger recognition unit during time that the augmented reality application is being provided to the user.

(2)

The information processing device according to the (1), wherein
the alarm unit alarms the user to a presence of a danger by controlling display of the augmented reality application.

(3)

The information processing device according to the (1) or (2), wherein
the alarm unit alarms the user to a presence of a danger by interrupting into the augmented reality application.

(4)

The information processing device according to any one of the (1) to (3), wherein
the alarm unit suspends or terminates the augmented reality application being provided to the user when a danger is recognized by the danger recognition unit.

(5)

The information processing device according to any one of the (1) to (4), wherein
the alarm unit makes a virtual object displayed in the augmented reality application being provided to the user flashing or translucent when a danger is recognized by the danger recognition unit.

(6)

The information processing device according to any one of the (1) to (5), wherein the alarm unit displays an object for warning on a screen on which the augmented reality application is being provided when a danger is recognized by the danger recognition unit.

(7)

The information processing device according to any one of the (1) to (6), wherein the object for warning indicates a position or a region corresponding to a cause of a danger recognized by the danger recognition unit.

(8)

The information processing device according to any one of the (1) to (7), wherein the danger recognition unit recognizes a presence of a real object likely to collide with the user in the real space as a danger.

(9)

The information processing device according to any one of the (1) to (8), further comprising:

an information acquisition unit that acquires dangerous region information defining a dangerous region with a relatively low level of safety in the real space, wherein the danger recognition unit recognizes approach or entry of the user to the dangerous region defined by the dangerous region information as a danger.

(10)

The information processing device according to any one of the (1) to (9), further comprising:

an information acquisition unit that acquires dangerous object information defining a dangerous object likely to cause a danger to the user in the real space, wherein the danger recognition unit recognizes approach of the user to the dangerous object defined by the dangerous object information as a danger.

(11)

The information processing device according to any one of the (1) to (10), wherein the danger recognition unit recognizes a danger when a proportion of the displayed virtual object on a screen exceeds a predetermined threshold.

(12)

The information processing device according to any one of the (1) to (11), wherein the alarm unit does not alarm the user to a presence of a danger for which an alarm has been already made to the user a number of times equal to a predetermined upper limit.

(13)

The information processing device according to any one of the (1) to (12), wherein the alarm unit does not alarm the user to a presence of a danger when the user is performing an action similar to an action contained in an action history of the user.

(14)

The information processing device according to any one of the (1) to (13), further comprising:

a setting unit that disables an alarm by the alarm unit for a danger previously specified by the user.

(15)

The information processing device according to any one of the (1) to (14), further comprising:

a range sensor that measures a distance between a real object in the real space and the user, wherein the danger recognition unit recognizes a danger faced by the user based on the distance from each real object measured by the range sensor.

(16)

The information processing device according to the (15), wherein the range sensor is mounted to be capable of measuring the distance along a direction different from an optical axis of an imaging device used for provision of the augmented reality application.

(17)

The information processing device according to any one of the (1) to (15), further comprising:

a communication unit that receives information about a danger from an external device, wherein the danger recognition unit recognizes a danger faced by the user using the information about a danger received by the communication unit.

(18)

The information processing device according to the (17), wherein the external device is a device placed on a real object or in a region likely to cause a danger to the user.

(19)

The information processing device according to the (17), wherein the external device is a device of another user having an equivalent danger alarm function to the information processing device.

(20)

The information processing device according to the (17), wherein the information about a danger is information identifying a position or a range of a real object or a region likely to cause a danger to the user, and the danger recognition unit recognizes a danger faced by the user based on the information about a danger and a position of the user.

(21)

An alarm method in an information processing device capable of providing to a user an augmented reality application that displays a virtual object superimposed onto a real space, comprising:

recognizing a danger faced by the user in the real space during time that the augmented reality application is being provided to the user; and alarming the user to a presence of a danger when a danger is recognized.

(22)

A program causing a computer controlling an information processing device capable of providing to a user an augmented reality application that displays a virtual object superimposed onto a real space to function as:

a danger recognition unit that recognizes a danger faced by the user in the real space; and an alarm unit that alarms the user to a presence of a danger when a danger is recognized by the danger recognition unit during time that the augmented reality application is being provided to the user.

REFERENCE SIGNS LIST

1 Real space
10 Block (example of dangerous object)
12 Stairs (example of dangerous region)
20a-c External device
100 Information processing device
102 Imaging unit
104 Sensor unit
106 Positioning unit
108 Communication unit
110 Storage unit
150 Estimation unit
160 Information acquisition unit
170 Danger recognition unit
180 Alarm unit
190 Setting unit

The invention claimed is:

1. An apparatus, comprising:
a memory configured to store instructions;
an imaging unit configured to image a real space to generate a representation of the real space;

a display unit; and
a Central Processing Unit (CPU) configured to:
transmit a first plurality of signals to display a first virtual image superimposed onto the representation of the real space, wherein the superimposed first virtual image is displayed on the display unit;
transmit a second plurality of signals to identify a potential source of interest for a user, wherein the potential source of interest is at least one of a real object or a region outside an angle of view of the imaging unit;
determine the potential source of interest based on an approach speed of the apparatus towards the potential source of interest that exceeds a threshold speed;
determine that the potential source of interest is the same as a previously notified potential source of interest based on a position of the potential source of interest and a user action history, wherein the user action history comprises a history of user movement;
increment a number of times that a user notification is generated for the potential source of interest, wherein the increment of the number of times is based on the determination that the potential source of interest is the same as the previously notified potential source of interest;
compare the incremented number of times that the user notification is generated for the potential source of interest with a threshold upper limit;
control, based on the determined potential source of interest, the display unit to display the superimposed first virtual image as a translucent image; and
control notification of the determined potential source of interest based on the comparison.

2. The apparatus of claim 1, wherein the CPU is further configured to analyze input signals to create the representation of the real space.

3. The apparatus of claim 1, wherein the potential source of interest corresponds to a potential source of danger for the user.

4. The apparatus of claim 1, wherein the user notification includes a first object indicative of the position of the determined potential source of interest.

5. The apparatus of claim 1, wherein the CPU is further configured to control the notification of the determined potential source of interest based on the display of the superimposed first virtual image as the translucent image.

6. The apparatus of claim 1, wherein the CPU is further configured to transmit a third plurality of signals to generate at least one of an audio alarm, a tactile alarm, or a visual alarm.

7. The apparatus of claim 6, wherein the visual alarm comprises a second virtual image.

8. The apparatus of claim 1, wherein the CPU is further configured to:
transmit a third plurality of signals to monitor a user action; and
identify the potential source of interest based on the monitored user action.

9. The apparatus of claim 8, wherein the CPU is further configured to determine that the user notification about the potential source of interest is based on the monitored user action.

10. The apparatus of claim 8, wherein the monitored user action comprises a series of actions.

11. The apparatus of claim 10, wherein the CPU is further configured to determine that the user notification is based on a comparison of a number of actions in the series of actions with a threshold number of user actions.

12. The apparatus of claim 10, wherein the CPU is further configured to determine that the series of actions indicate that the user has one of avoided the potential source of interest or approached the potential source of interest.

13. The apparatus of claim 8, wherein the monitored user action is a reaction to a type of the potential source of interest.

14. The apparatus of claim 1, wherein the CPU is further configured to identify the potential source of interest based on at least one of:
an analysis of the representation of the real space,
reception of a first signal that indicates a distance between the apparatus and the potential source of interest, or
reception of a second signal from an external device.

15. The apparatus of claim 14, wherein the analysis comprises a search of the representation of the real space for the potential source of interest.

16. The apparatus of claim 1, wherein
the apparatus is a user device, and
the CPU is further configured to transmit the second plurality of signals to a remote server for identification of the potential source of interest.

17. The apparatus of claim 1, wherein
the apparatus is a server, and
the CPU is further configured to transmit the second plurality of signals to a user device for identification of the potential source of interest.

18. The apparatus of claim 1, wherein the CPU is further configured to determine that the user has approached the region based on a comparison of a distance, between a boundary of the region and a current user position, with a threshold value.

19. The apparatus of claim 1, wherein the CPU is further configured to:
receive a beacon from the potential source of interest, wherein the beacon comprises an identifier of the potential source of interest, and position data of the potential source of interest; and
determine the potential source of interest based on the position data in the beacon and a current user position.

20. The apparatus of claim 1, wherein the CPU is further configured to determine the potential source of interest based on a variation of a level of one of a floor or a ground.

21. A method, comprising:
in an apparatus:
imaging a real space by an imaging device;
generating a representation of the real space based on the imaging of the real space;
displaying a virtual image superimposed onto the representation of the real space, wherein the superimposed virtual image is displayed on a display unit;
determining a potential source of interest for a user based on an approach speed of the apparatus towards the potential source of interest that exceeds a threshold speed, wherein the potential source of interest is at least one of a real object or a region outside an angle of view of the imaging device;
determining that the potential source of interest is the same as a previously notified potential source of interest based on a position of the potential source of interest and a user action history, wherein the user action history comprises a history of user movement;
incrementing a number of times that a user notification is generated for the potential source of interest, wherein the increment of the number of times is based on the determination that the potential source of interest is the same as the previously notified potential source of interest;

comparing the incremented number of times that the user notification is generated for the potential source of interest with a threshold upper limit;

controlling, based on the determined potential source of interest, the display unit to display the superimposed virtual image as a translucent image; and controlling notification of the determined potential source of interest based on the comparison.

22. A non-transitory computer-readable medium having stored thereon computer-executable instructions that, when executed by a processor of an apparatus, cause the processor to execute operations, the operations comprising:

generating a representation of a real space by imaging the real space;

displaying a virtual image superimposed onto the representation of the real space, wherein the superimposed virtual image is displayed on a display unit;

determining a potential source of interest for a user based on an approach speed of the apparatus towards the potential source of interest that exceeds a threshold speed, wherein the potential source of interest is at least one of a real object or a region outside an angle of view of the imaging;

determining that the potential source of interest is the same as a previously notified potential source of interest based on a position of the potential source of interest and a user action history, wherein the user action history comprises a history of user movement;

incrementing a number of times that a user notification is generated for the potential source of interest, wherein the increment of the number of times is based on the determination that the potential source of interest is the same as the previously notified potential source of interest;

comparing the incremented number of times that the user notification is generated for the potential source of interest with a threshold upper limit;

controlling, based on the determined potential source of interest, the display unit to display the superimposed virtual image as a translucent image; and controlling notification of the determined potential source of interest based on the comparison.

* * * * *